United States Patent [19]

Tanimizu et al.

[11] Patent Number: 5,332,046
[45] Date of Patent: Jul. 26, 1994

[54] AGRICULTURAL MACHINE WITH PLOW HAVING CHANGEABLE PENETRATING ANGLE

[75] Inventors: Mikio Tanimizu; Kouichi Kawano, both of Ibaraki, Japan

[73] Assignee: Sugano Farm Machinery Mfg. Co., Ltd., Hokkaido, Japan

[21] Appl. No.: 943,871

[22] Filed: Sep. 11, 1992

[30] Foreign Application Priority Data

Dec. 13, 1991 [JP] Japan .................. 3-351194
Apr. 9, 1992 [JP] Japan .................. 4-115223

[51] Int. Cl.⁵ ............................ A01B 15/12
[52] U.S. Cl. .................... 172/739; 172/445; 172/448
[58] Field of Search ........... 172/204, 209, 219, 618, 172/640, 734, 739, 744, 763; 403/104, 106, 321; 172/47, 272, 439, 445, 448, 669, 675, 677, 679

[56] References Cited

U.S. PATENT DOCUMENTS

| | | | |
|---|---|---|---|
| 2,916,835 | 12/1959 | Boyce | 172/448 |
| 3,032,903 | 5/1962 | Ede | 172/448 |
| 3,139,943 | 7/1964 | Evans et al. | 172/445 |
| 3,752,239 | 8/1973 | Kelley | 172/739 X |

Primary Examiner—Andrew M. Falik
Assistant Examiner—John J. Calvert
Attorney, Agent, or Firm—Sughrue, Mion, Zinn, Macpeak & Seas

[57] ABSTRACT

An agricultural machine including a fixed mast secured to a frame body so as to be projected from a front end portion of the frame body, a movable mast which is pivotably mounted to the fixed mast so as to be arcuately movable in an agricultural working direction relatively to the fixed mast and has a mount portion to which a top link of a tractor is mounted, and a mode selecting mechanism provided between the movable mast and the fixed mast for changing and fixing a positional relationship between the movable mast and the fixed mast interlockingly with a lifting operation of the agricultural machine to thereby freely change a penetrating angle of the agricultural machine into the soil.

18 Claims, 20 Drawing Sheets

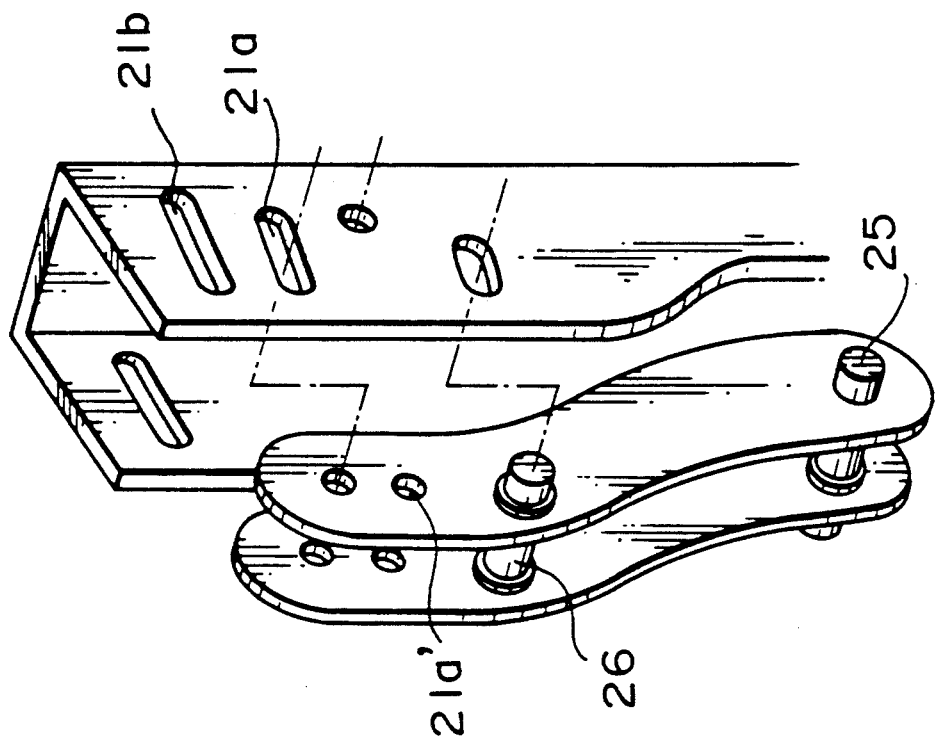
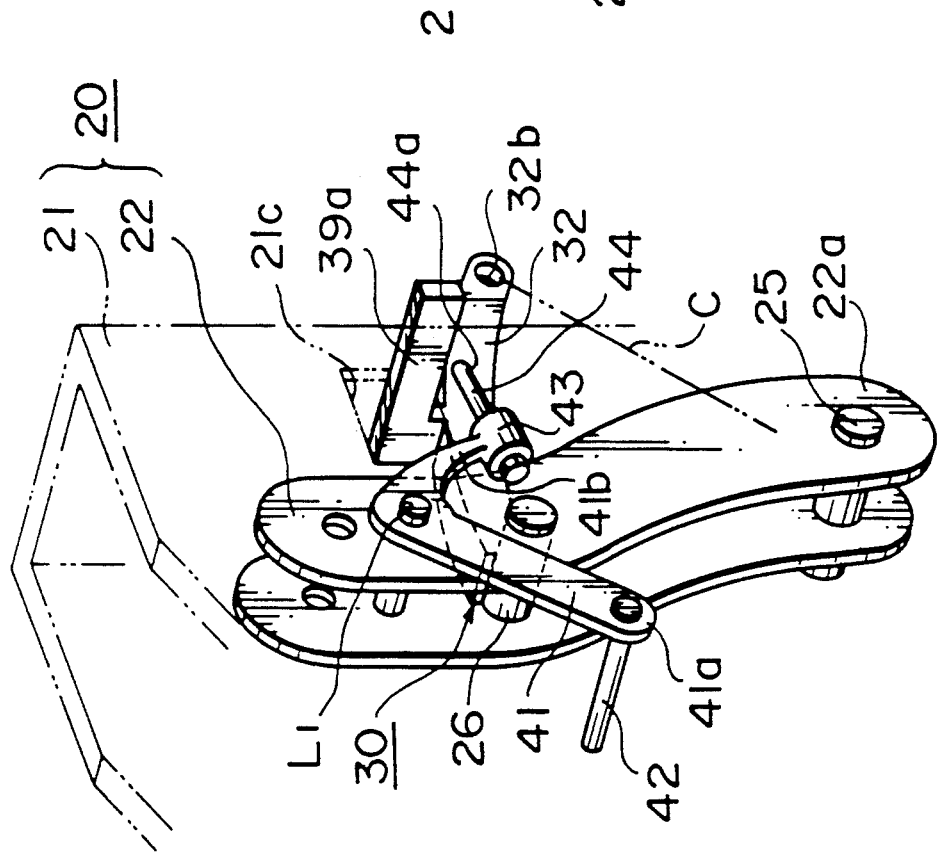

AGRICULTURAL MACHINE WITH PLOW HAVING CHANGEABLE PENETRATING ANGLE

BACKGROUND OF THE INVENTION

1. Field of the Invention

This invention relates to an agricultural machine having a plow whose penetrating angle is changeable to reduce the area of a headland, and more particularly to an agricultural machine having an elongated body in an agricultural working direction, such as a bottom plowing machine, a sub soiler, a digging machine or the like, which carries out a plowing work in a deep portion of the soil.

2. Description of Related Art

A bottom plowing machine has been typically known as one of the agricultural machines for performing a plowing work. A square plowing or reciprocal plowing has been utilized as a plowing manner using the bottom plowing machine. The reciprocal plowing has been mainly utilized particularly for a reversible plowing machine, for example. When the plowing work is required for a field, the bottom plowing machine is installed to a tractor, and hauled by the tractor while it is contacted with the soil. At the initial stage of the plowing work, the bottom plowing machine is hauled by the tractor while a bottom of the bottom plowing machine is inclined at a predetermined penetrating angle with respect to the soil until it digs into a predetermined depth of soil. In order for the bottom of the bottom plowing machine to dig into the predetermined depth of soil using a suction angle inherent to shares of the bottom, the tractor has been conventionally required to move at a very long distance for the following reason.

The bottom plow is generally installed to the tractor through a three-point hitch mechanism comprising one top link and two lower links. The bottom is kept lifted in its non-operation state by the three-point hitch mechanism. In order to start the plowing operation of the bottom, the lifted bottom is downwardly descended by the hitch mechanism until it contacts the surface of the field and then the tractor is moved while the bottom is contacted with the soil. At the initial stage where the tractor starts its movement, the bottom is penetrated into the soil of the field at a shallow depth due to its weight, and thus the tractor is required to move at a sufficient plowing distance until the bottom is penetrated into the field due to its weight and reaches a predetermined deep depth which enables the plowing operation. This distance at which the tractor must move before starting the actual plowing operation is dependent on the suctional angle which is inherently set for the share of the bottom. In other words, a headland on which the tractor is turned at a time between the plowing operation for a one-line on the field and the plowing operation for another one-line on the field and then is straightly moved until the bottom is penetrated (digs) into the predetermined depth of soil, is superfluously required to perform the plowing operation. The area (width) of the headland is determined by the suction angle, and thus it is impossible to reduce the area of the headland because the suction angle is inherent to the share of the bottom and thus is invariable.

In an agricultural work using the agricultural machine as described above, even if the area of the headland which is required for the turning of the tractor (width of opening of the tractor) can be reduced, the tractor is still required to move at a sufficient distance (width) of the headland until the bottom penetrates into the predetermined depth of soil. Therefore, the total area of the headlands which are located at the both sides of the field in the plowing direction is necessarily large. Therefore, in a relatively-narrow field such as a field in Japan, a field to be actually plowed by an agricultural machine such as a plow machine is narrow, and more time is required for a treatment work for the headland after the plowing operation has been completed for the field to be actually plowed. This causes a problem in that a working efficiency is lowered as a whole. In addition, the lift height of the bottom (i.e., the height at which the bottom is lifted up from the surface of the field at maximum) is inherently determined in accordance with the performance of the tractor utilized, so that the bottom nearest to the tractor (if a multi-linked bottom type is used) cannot be lifted up at a sufficient lift height. Therefore, when an agricultural machine having an elongated body in the rear direction is used, a front or rear portion of the machine is liable to abut against a ridge when the tractor is transferred from a field to another field over the ridge, and this contact between the bottom and the ridge obstructs the running of the tractor. Particularly when the multi-linked bottom type comprising plural bottoms which are linked in series are used, the movement of the tractor over a ridge is impossible in a relatively-narrow field. In other words, a plowing machine having a large size cannot be used in a relatively-narrow field. If the angle of penetration of the bottom can be changed to a relatively large one only at the start time of the plowing work or at the time when the plowing machine is moved in its non-operation state, the bottom could easily penetrate into the field at a short moving distance of the tractor, and thus the area of the headland could be reduced. Accordingly, the plowing work could be carried out with a headland area required for the turning of the tractor and a slight distance required for the penetration of the bottom into the predetermined depth of soil, and the tractor could run on the field without suffering disturbance from an obstacle such as a ridge while plowing the field by the agricultural machine. However, as described above, the suction angle of the bottom is inherent to the bottom itself (i.e., it is fixed to an invariable one), and it is impossible to increase the suction angle of the bottom only during the plowing work, or at the normal running operation. Accordingly, the conventional agricultural machine having a plow has disadvantages in that the plow cannot be efficiently used in a narrow field, and trouble frequently occurs in the running operation of the tractor.

SUMMARY OF THE INVENTION

An object of this invention is to provide an agricultural machine such as a plowing machine having a bottom whose penetrating angle (an inclined angle of the bottom to the surface of a field) can be freely changed (increased) only at a start time of a plowing work or the like, so that the bottom can be penetrated into a predetermined depth of soil with a tractor's movement (run) at a short distance and the bottom can be lifted up at a height which exceeds its inherent lifting height.

In order to attain the above object, an agricultural machine according to this invention which has a frame and a mast through which a top link of a tractor is mounted to the frame to perform a plowing operation through a running of the tractor, includes a fixed mast secured to the frame so as to be projected from a front end portion of the frame, a movable mast which is pivotably mounted to the fixed mast so as to be arcuately movable in an agricultural working direction relatively to the fixed mast and has a mount portion to which the top link is mounted, and means for changing a penetrating angle of said agricultural machine into the soil, said means for changing the penetrating angle comprising a mode selecting mechanism provided between the movable mast and the fixed mast for changing and fixing a positional relationship between the movable mast and the fixed mast interlockingly with a lifting operation of the agricultural machine to thereby freely change the penetrating angle of the agricultural machine into the soil.

BRIEF DESCRIPTION OF THE DRAWINGS

FIGS. 3A and 3B are exploded perspective views of the mast mechanism as shown in FIG. 2;

DETAILED DESCRIPTION OF THE PREFERRED EMBODIMENTS

A first embodiment in which this invention is applied to a plowing machine will be described with reference to FIGS. 1 to 16.

Figure 1:
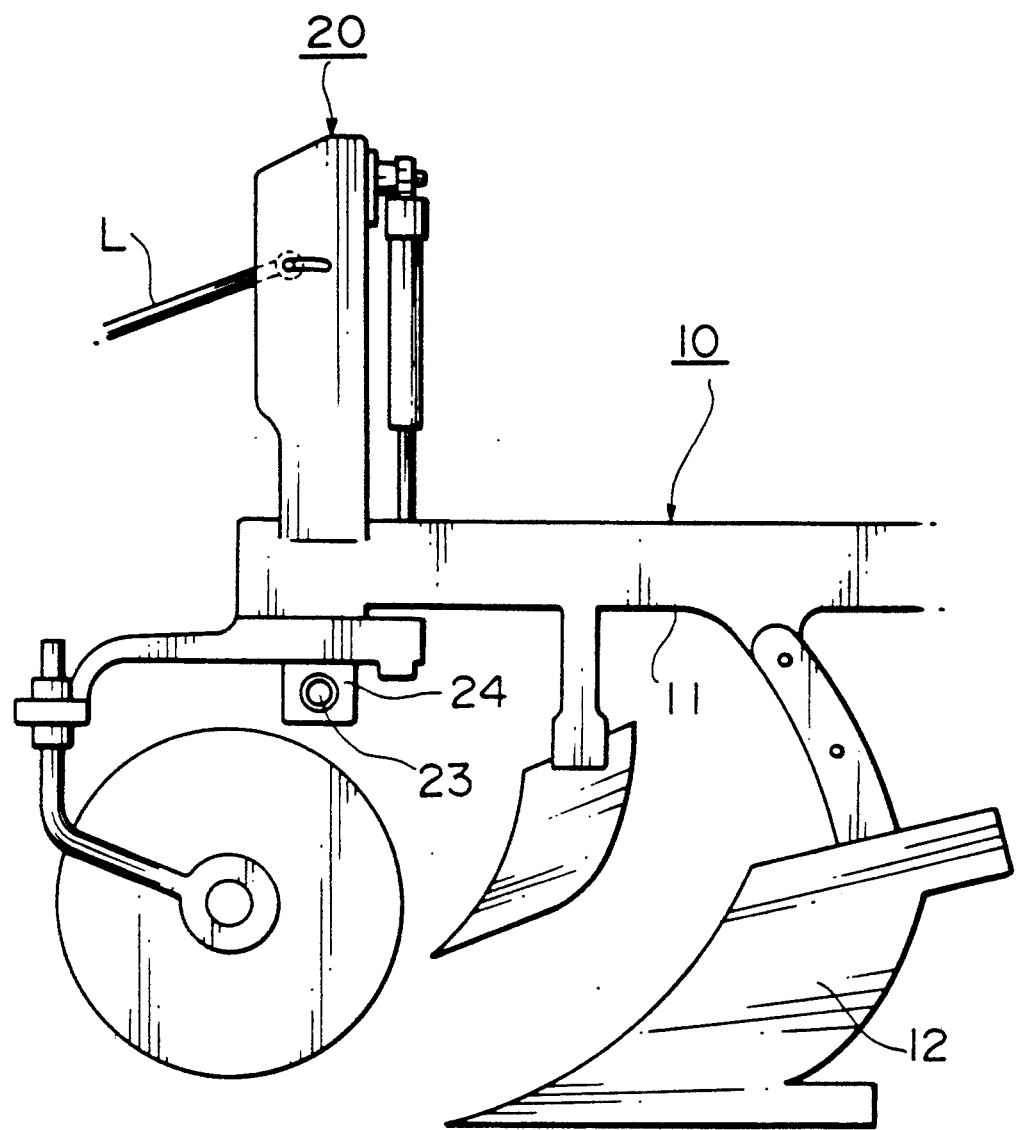
FIG. 1 schematically shows the whole construction of a plowing machine to which this invention is applied.
Figure 2:
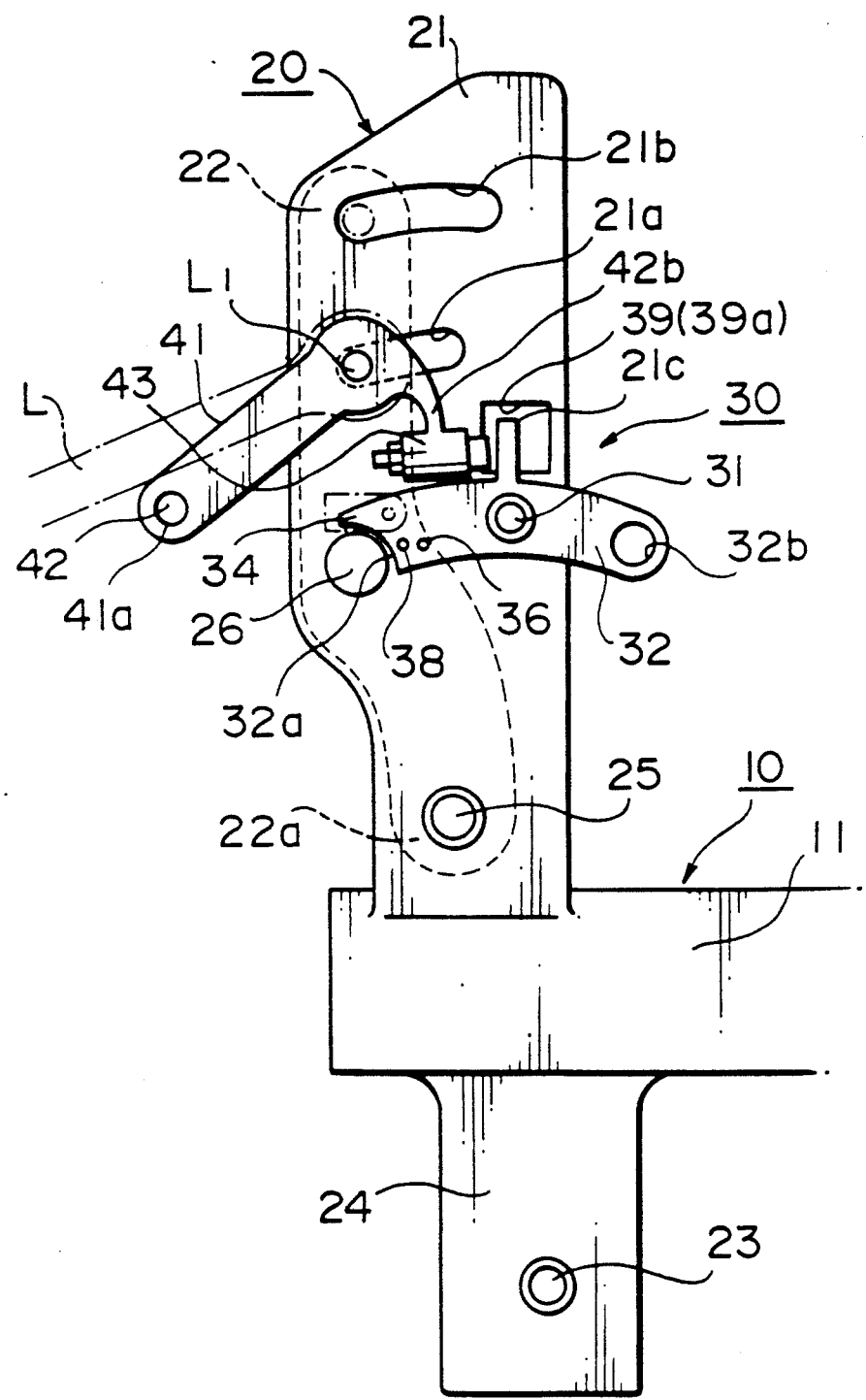
FIG. 2 is a detailed side view of a mast mechanism of the plowing machine as shown in FIG. 1.

A reference numeral 10 represents a plowing machine to which this invention is applied, and the plowing machine comprises a plow frame 11 and a multi-linked type bottom comprising plural bottoms 12 secured to the plow frame 11. The plow frame 11 is provided with a mast mechanism 20 as shown in FIG. 2 such that the mast mechanism 20 is projected from the front end portion of the plow frame 11 in a work propagating direction. The mast mechanism 20 comprises a fixed mast 21 which is fixedly secured to the plow frame 11 at the lower portion thereof, and a movable mast 22 which is mounted to the fixed mast 21 so as to be movable in a suitable range. As shown in FIG. 2, the fixed mast 21 extends downwardly, and the lower portion thereof constitutes a mount frame 24 having a hitch pin 23 through which the lower links of the tractor are mounted to the mount frame 24.

The fixed mast 21 comprises a plate member having a U-shaped section, and has a wholly-opening front surface (the surface of the fixed mast 21 at the tractor side) and a partly-opened rear surface (the surface of the fixed mast 21 at the rear side). The movable mast 22 is movably disposed in an inner space of the fixed mast 21. The movable mast 22 comprises a pair of plate members which are parallely disposed at a suitable interval and linked with each other. The movable mast 22 has a through hole at the lower portion 22a of each of the two plate members and the fixed mast 21 also has a through hole at the position which confronts the through holes of the movable mast 22. The movable mast 22 is pivotably mounted to the fixed mast 21 by a mount pin 25 which is inserted through both of the through holes of the fixed mast 21 and the movable mast 22, and thus the movable mast 22 is swingably (arcuately) movable around the mount pin 25 in a suitable range in the inner space of the fixed mast 21.

As shown in FIG. 2, the movable mast 22 has a pin-type load receiving member 26 serving as a lock mechanism which is located at the position higher than the inserting position of the mount pin 25. The load receiving member 26 extends in the direction of the width of the movable mast 22, and both ends thereof are outwardly projected from the two parallel plate members of the movable mast 22, respectively. Further, the movable mast 22 has two through holes (or at least one through hole) at the upper portion of each plate member, and the top link L of the tractor is mounted to the movable mast 22 by a mount pin L1 which is inserted through any one of the through holes at each plate member and whose ends are outwardly projected to the two plate members of the movable mast 22. The fixed mast 21 has elongated holes 21a and 21b which are formed at the side walls thereof so as to confront the through holes of the movable mast 22 as shown in FIG. 2, and both ends of the mount pin L1 are engageable with any one of the elongated holes 21a and 21b. Therefore, the top link L of the tractor is fixedly mounted to the movable mast 22 without falling off from the movable mast 22, and the movable mast is slidably guided along any one of the elongated through holes 21a and 21b. The elongated holes 21a and 21b may be formed in a arcuate shape with the mount pin 25 at the center thereof, and thus the mount pin L1, that is, the movable mast 22 is arcuately slidable along the arcuate elongated holes 21a and 21b at a distance corresponding to the length of the elongated holes 21a and 21b. In other words, the mount pin L1 is engaged with any one of the elongated holes 21a and 21b serving as a guide member which are formed at the side walls of the fixed mast 21, and the motion of the mount pin L1 is restricted by the elongated holes 21a and 21b, whereby the mount pin L1 serves to freely control an orientation state (between a frontward-oriented state and a rearward-oriented state (erected state)) of the movable mast 22 in a range corresponding to the arcuate shape and length of the elongated holes 21a and 21b. The positional relationship between the through holes and the load receiving member 26 of the movable mast 22 and the holes of the fixed mast 21 is shown in FIG. 3A.

As described later, through cooperation between the load receiving member 26 and a mode selecting mechanism 30 as shown in FIG. 2, the movable mast 22 is transferred to the rearward-oriented state to increase a slant or penetrating angle of the bottom with respect to the surface of the field when the plowing machine is lifted up to allow the tractor to move for a normal running or a plowing operation, so that the bottom is upwardly lifted at a height exceeding its inherent lifting height, or the angle of penetration of the bottom is increased.

Figure 4:
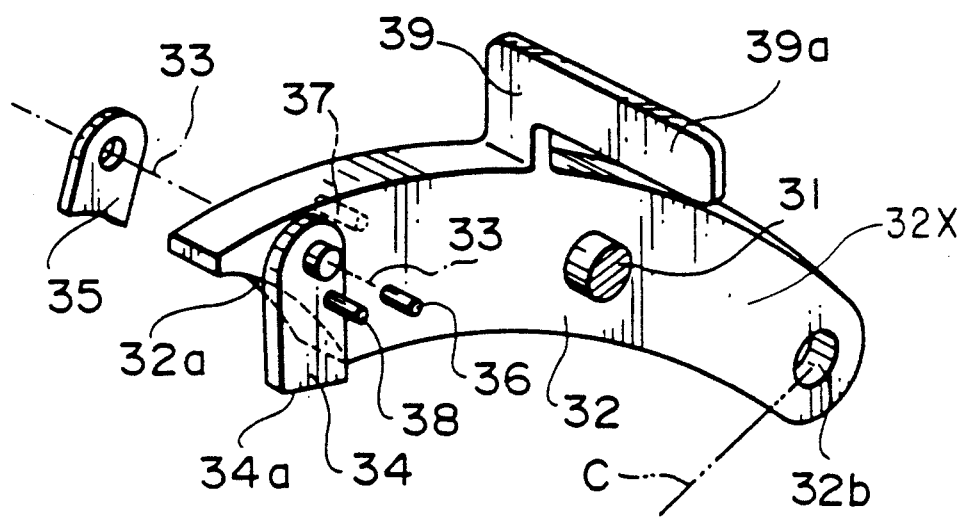
FIG. 4 shows a mode selecting mechanism for the plowing machine as shown in FIG. 1.
Figure 5:
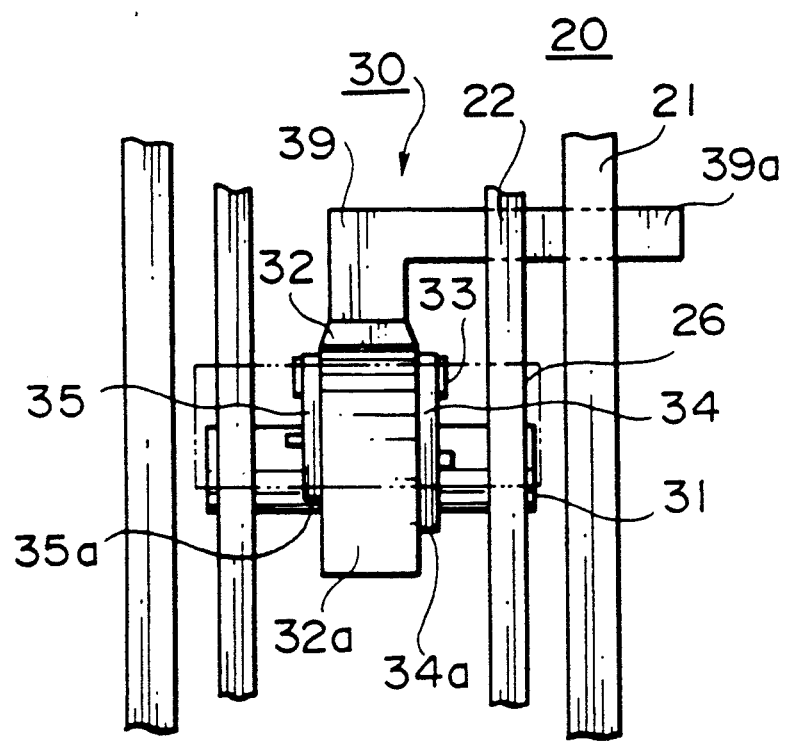
FIG. 5 is a plan view of the mode selecting mechanism as shown in FIG. 4.

As shown in FIG. 4, the mode selecting mechanism 30 has a plate-like lock member 32 which is pivotably mounted to the fixed mast 21 by a thick pivot shaft 31. The lock member 32 is provided in the inner space of the fixed mast 21 so as to be rotatable (swingable) in parallel to a plane containing the side walls of the fixed mast 21 with the pivot shaft 31 being the rotational center thereof. The lock member 32 has a downwardly-curved portion 32a at the tip portion thereof, which has a profile corresponding to the shape of the curved surface of the load receiving member 26, and the downwardly-rotational motion of the lock member 32 is restricted through the engagement between the curved portion 32a of the lock member 32 and the peripheral surface of the load receiving member 26. Accordingly, the load receiving member 26 is located at the position lower than the pivot shaft 31 of the lock member 32.

As shown in FIG. 4, the lock member 32 has a slender shaft 33 whose ends are projected from the lip portion of the lock member 32, and a lock pawl 34 and an unlock pawl 35 are freely rotatably mounted to both ends of the shaft 33 at the opposite sides of the lock member 32. The lock pawl 34 has a flat surface at the free end portion 34a thereof while the free end portion 35a of the unlock pawl 35 has a curved surface whose shape corresponds to the peripheral surface of the load receiving member 26. Each of the lock pawl 34 and the unlock pawl 35 is so designed that it serves as a projecting member which abuts against the surface of the load receiving member 26 when the flat or curved surface of each pawl is rotated to a lower position.

Figure 8:
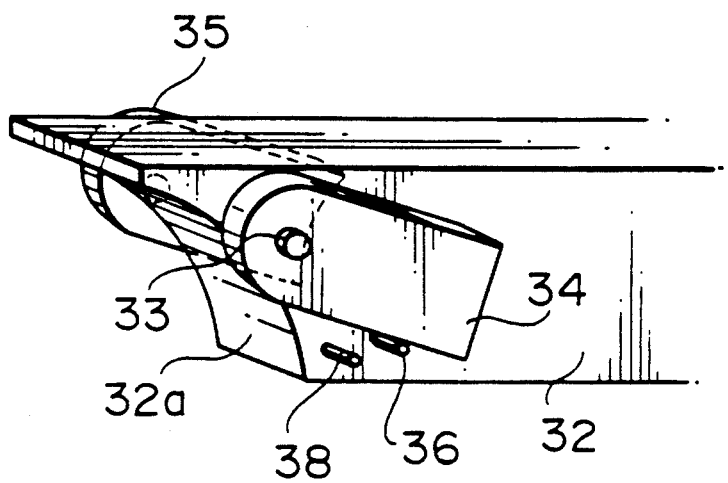
FIG. 8 is a schematic view showing a lock mode of the mode selecting mechanism.

A stopper pin 36 serving to restrict the rotational motion of the lock pawl 34 and a stopper pin 37 serving to restrict the rotational motion of the unlock pawl 35 are projectingly provided at the side surfaces of the lock member 32. As shown in FIG. 8, the stopper pin 36 is located at a lower position than the shaft 33, and serves to prevent the lock pawl 34 from being further rotated frontwardly (clockwisely in FIG. 8) after the lock pawl 34 is rearwardly (clockwisely) rotated to a rear side of the stopper pin 36, that is, serves to keep the lock pawl 36 in its storage state. In addition, a stopper pin 38 serving to restrict the rotational motion of the lock pawl 34 is also projectingly provided at the same side surface as the stopper pin 36, and serves to prevent the lock pawl 34 from being further rotated rearwardly (counterclockwisely in FIG. 8) after the lock pawl 34 is frontwardly (counterclockwisely) rotated to a front side of the stopper pin 38. Likewise, the unlock pawl 35 abuts against the stopper pin 37 when it is rearwardly rotated, and thus is prevented from being further rotated rearwardly. Therefore, the stopper 37 serves to keep the unlock pawl 35 in its storage state.

The lock member 32 is further provided with a projection member 39 at the top surface thereof as shown in FIG. 4. The free end of the projection member 39 is bend by 90 degrees with respect to the elongated body of the lock member 32, and serves as an arm member 39a. The arm member 39a is outwardly projected through a window 21c formed on the side wall of the fixed mast 21 as shown in FIG. 2 such that it does not obstruct the swingable motion of the movable mast 22.

The movable mast 22 is further provided with a hanger-shaped swingable arm 41 having longer and shorter hands so as to be swingable around the mount pin L1 to which the top link L is mounted. The end portion 41a of the longer hand of the swingable arm 41 is fixedly provided with an arm 42 extending in a traverse direction to a plane containing the top link L. In addition, the end portion 41b of the shorter hand of the swingable arm 41 is formed with a boss portion 43 having an adjusting screw inserted thereto. The tip portion 44a of the adjusting screw 44 is designed so as to abut against an X-point of the arm 39a to rearwardly push the arm 39a with suitable stroke as shown in FIG. 2. The arm 42 is in contact with the lower surface of the top link L, and the top link L is allowed to push the arm 42 downwardly when the bottom plowing machine 10 is lifted up.

The following modifications may be made to the lock member 32.

The lock member 32 is so designed as to be elongated at the rear side of the pivot shaft 31 to form an arm portion 32x as shown in FIG. 4 at the elongated rear portion of the lock member 32. The arm portion 32x is formed with a through hole 32b at the end portion thereof, and one end of a drawing member such as a chain C is fixedly linked to the through hole 32b while the other end of the chain C is linked to a draw bar of the tractor T. When the plowing machine is lifted up, the chain C is supplied with a drawing force, and the lock member 32 is clockwisely rotated by the drawing force of the chain C to release the engagement between the curved surface of the lock member 32 and the load receiving member 26.

Alternately, a plunger is provided in place of the adjusting screw 44. The plunger is operated interlockingly with the upward motion of the top link L, and the X-point of the arm 39a is rearwardly pushed through a projecting motion of the plunger. In this case, a switch for driving the plunger may be disposed at a position where the upward motion of the top link L is detected, or at a position where an upward-lifting operation of the tractor T is detected.

Next, a plowing work using an agricultural machine, particularly a plowing machine to which this invention is applied, will be described.

Figure 7:
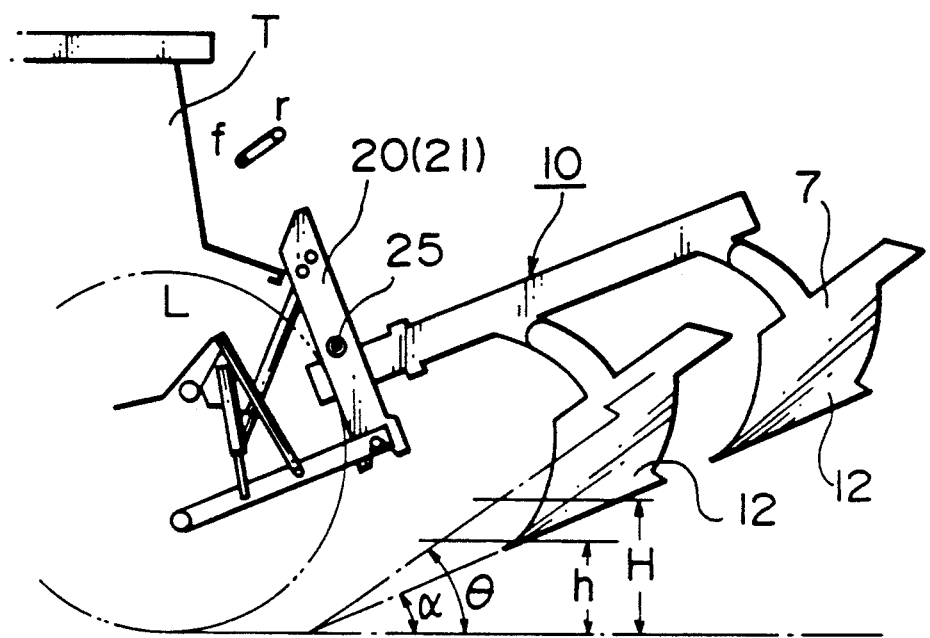
FIG. 7 is a side view of a lifting state of the plowing machine.

First, the plowing machine is installed to a tractor T through a three-point hitch mechanism as conventionally known. For example, the top link L is secured to the movable mast 22 by the mount pin L1 which is inserted through a top link hole 21a' of the movable mast 22 and the elongated hole 21a of the fixed mast 21 as shown in FIG. 3A. In a normal state the mount pin L1 is located at a position f (in the frontward-oriented position) as shown in FIGS. 2 and 3 which is nearest to the tractor side. When a plowing work is started in this state, the bottom 12 having a predetermined suction angle is horizontally moved by the tractor and digs into the soil due to its weight. However, the bottom 12, that is, the tractor T must move at a long distance until the bottom 12 reaches a predetermined depth of the soil. Accordingly, in this invention, the penetrating angle of the bottom 12 is beforehand switched from a normal angle $\alpha$ to an angle $\theta$ which is slightly larger than the normal angle $\alpha$ as shown in FIG. 7 at the time when the plowing work is started, whereby the bottom 12 can reach the predetermined depth of the soil at a relatively short moving distance of the tractor T. This switching operation of the penetrating angle of the bottom 12 is controlled by the mode selecting mechanism 30, and it will be hereunder described in detail.

The mode selecting mechanism 30 serves to select any one of three modes, that is, a lock mode in which the movable mast 22 is fixed to the frontward-oriented state, a free mode in which the movable mast 22 is kept in a free state between the frontward-oriented state and the rearward-oriented state, so that the penetrating angle of the bottom 12 is freely changeable in accordance with the plowing condition, and an automatic mode in which the movable mast 22 is transferred to the rearward-oriented state only at the start time of the plowing work, and is automatically kept to the frontward-oriented state when the plowing operation is actually carried out.

The lock mode will be first described below.

Figure 6:
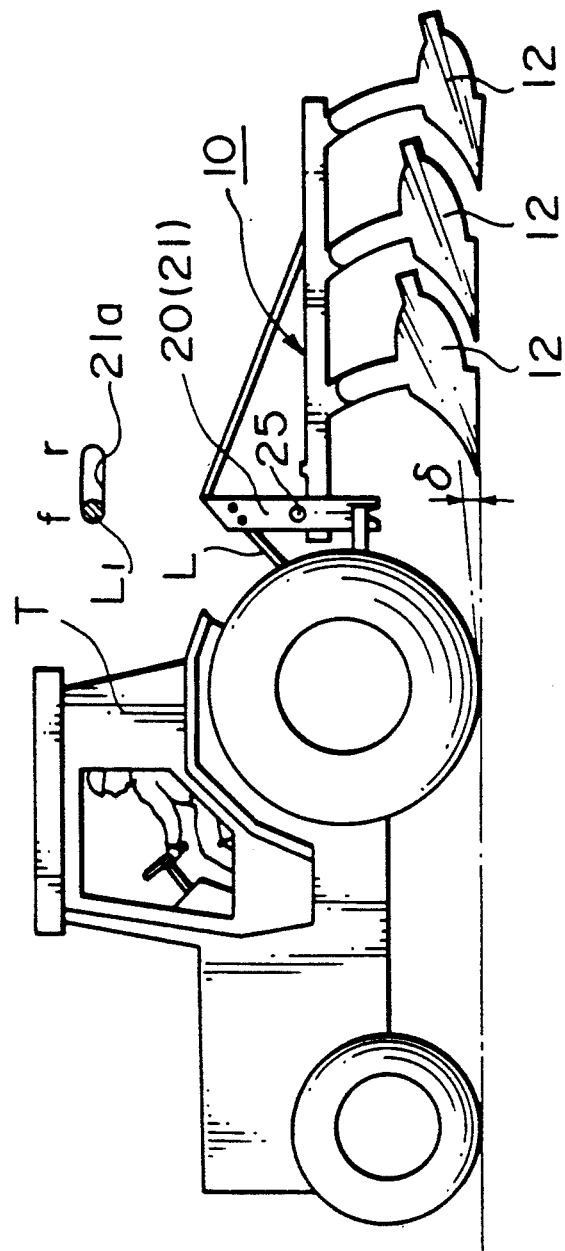
FIG. 6 is a side view of a tractor and the plowing machine installed to the tractor.

The lock mode is defined as a mode for keeping a state where the movable mast 22 is fixed to the fixed mast 21 in its frontward-oriented state by the cooperation between the lock mechanism 30 and the mode selecting mechanism 32. In the lock mode, as shown in FIG. 2, the pivot shaft L1 is located at the front side of the elongated hole 21a (the one end of the elongated hole 21a which is nearest to the tractor T), and the movable mast 22 is kept in the frontward-oriented state with respect to the fixed mast 21 even when the plowing machine is lifted up by the tractor T (the mount pin 31 is located at the position f in the elongated hole 21a as shown in FIG. 6).

Even if a plowing load is imposed on the bottom 12 in this state, the movable mast 22 is kept in the frontward-oriented state, and the mount pin L1 is still located at the position f of the elongated hole 21a, that is, the movable mast 22 is still kept in the frontward-oriented state. This lock mode is selected by the following manner. As shown in FIG. 8, both of the lock pawl 34 and the unlock pawl 35 are rearwardly rotated until they are mounted on the stopper pins 36 and 37 respectively, and thus they are kept in their storage states. In these storage states of the lock pawl 34 and the unlock pawl 35, the curved surface 32a of the lock member 32 is directly engaged with the peripheral surface of the load receiving member 26 which is provided integrally to the movable mast 22, so that the rearward motion of the movable mast 22 is restricted, that is, the movable mast is fixed to the frontward-oriented state. This state is identical to a state which can be uniquely adopted by a conventional plowing machine.

When the plowing machine 10 is lifted up in the lock mode as described above, as shown in FIG. 2, the swingable arm 41 abuts against the top link L, and is pushed downwardly by the top link L, so that the swingable arm 41 is counterclockwisely rotated in FIG. 2. Interlockingly with the counterclockwise rotation of the swingable arm 41, the projection member 39 is rearwardly pushed by the end portion of the adjusting screw 44 which is inserted through the boss portion 43, and the lock member 32 is clockwisely rotated around the pivot shaft 31, so that the engagement between the load receiving member 26 and the curved surface of the lock member 32 is released. That is, in a state where the plowing machine is lifted up, the lock mode (state) is temporarily released.

If one end of the chain C is linked to the through hole 32b formed at the end portion of the lock member 32 and the other end of the chain C is linked to the draw bar of the tractor T, the lock member 32 is clockwisely rotated interlockingly with the lifting operation of the tractor T, and an effect which would be obtained when the arm 39a of the projecting member 39 is rearwardly pushed can be obtained. In this case, the swingable arm 41 and the arm 42 can be omitted. When the plowing machine 10 is downwardly descended, the movable mast 22 is kept to the lock state again.

The free mode will be next described hereunder.

The free mode is selected as follows. As shown in FIGS. 13, 14, 15 and 16, the lock pawl 34 is kept to its storage state (i.e., mounted on the pin 34) while the unlock pawl is rotated to the tractor side and hung down due to its weight. The unlock pawl 35 is prevented from being downwardly moved because the end portion (curved surface) 35a of the unlock pawl 35 is mounted on (engaged with) the load receiving member 26. When the plowing machine 10 is lifted up in this state, the movable mast 22 is transferred to the rearward-oriented state (erection state), and the lock member 32 is also moved rearwardly together with the load receiving member 26 (the movable mast 22) while the unlock pawl 35 is mounted on the load receiving member 26. In this lift-up state, even when the plowing machine 10 is downwardly descended, the curved surface of the end portion 35 of the unlock pawl 35 remains mounted on the load receiving member 26, and thus the lock member 32 is prevented from being engaged with the load receiving member 26. Therefore, even when the plowing machine 10 has been downwardly descended, the lock member 32 is kept spacedly from the load receiving member 26 at a constant distance without engaging with the load receiving member 26 (that is, not transferred to the lock state).

Accordingly, the movable mast 22 is freely movable along the elongated hole 21a with the unlock pawl 35 being mounted on the load receiving member 26. In other words, there is no linkage between the movable mast 22 and the fixed mast 21. In such a free mode, the movable mast 22 is freely movable within the elongated hole 21a without being restricted by the fixed mast 21.

Next, the automatic mode will be described hereunder.

The automatic mode is selected as follows. As shown in FIGS. 9, 10, 11 and 12, the unlock pawl 35 is kept to its storage state (i.e., mounted on the pin 37) while the lock pawl 34 is frontwardly rotated and hung down due its weight. When the plowing machine 10 is lifted up in this state, the lock pawl 34 is floated in the air, but restricted by the stopper pin 38. When the plowing machine 10 is downwardly descended from this lifting state, the lock pawl 34 is mounted on the load receiving member 26 to prevent the lock member 32 from abutting against the load receiving member 26. In this state, an interval is kept between the lock member 32 and the load receiving member 26, so that the movable mast 22 cannot keep its frontward-oriented state, but is freely changeable to its rearward-oriented state. In other words, the movable mast 22 is in a state where it is not restrained to be in the frontward-oriented state (hereinafter referred to a free mode in the automatic mode).

Figure 12:
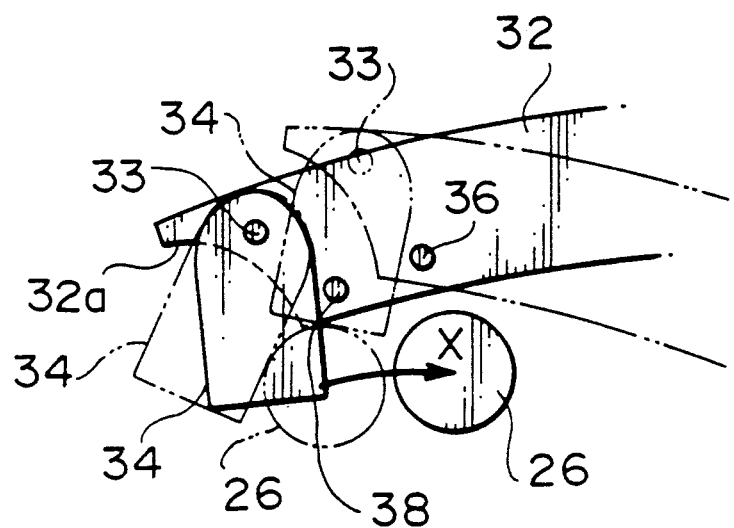
FIG. 12 is a side view showing an operation in the automatic mode.
Figure 13:
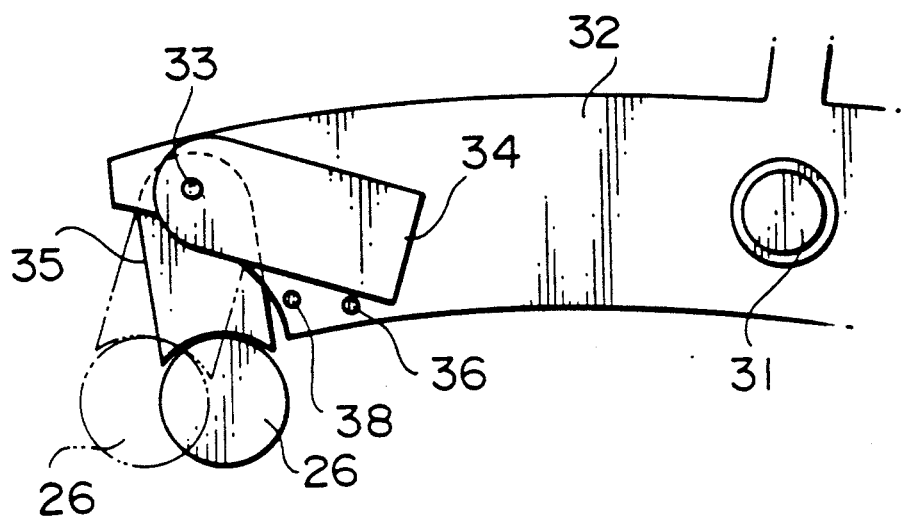
FIGS. 13 and 14 are side views of the mode selecting mechanism when a free mode is selected.
Figure 14:
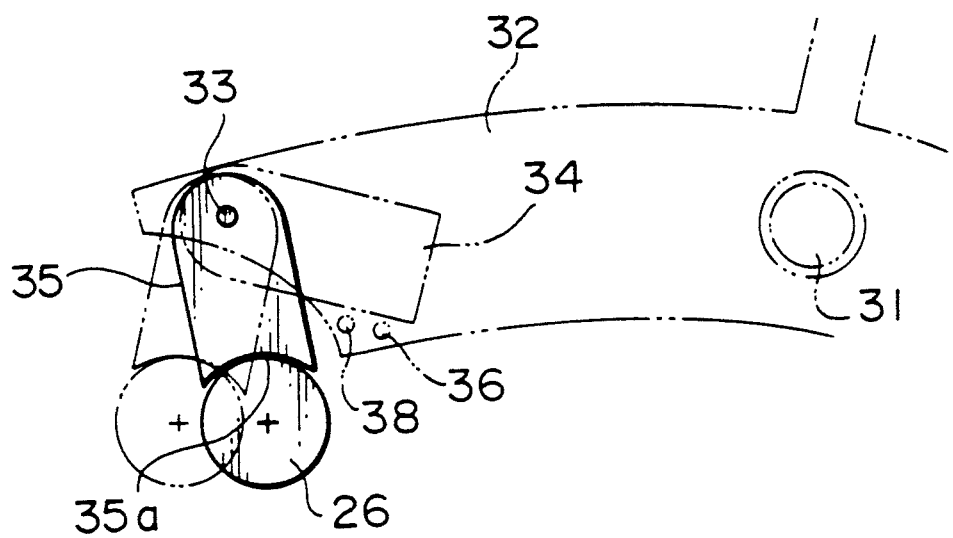
Figure 15:
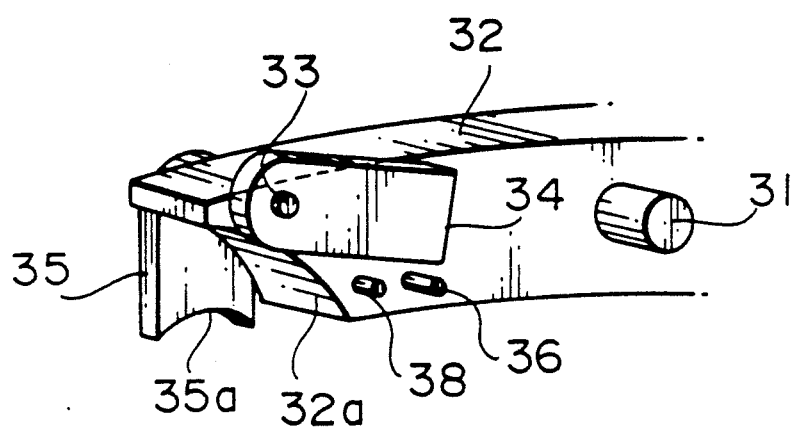
FIG. 15 is a perspective view of the mode selecting mechanism as shown in FIG. 14.
Figure 16:
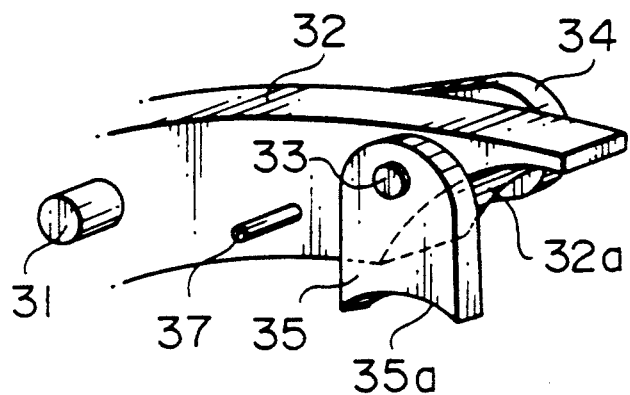
FIG. 16 is a perspective view of the mode selecting mechanism as shown in FIG. 14, which is viewed from the opposite side to that of FIG. 15.

In this state, when the tractor T is moved to start the plowing work of the bottom, a resistance force is applied from the soil to the bottom (thus the fixed mast 21). Therefore, the movable mast 22 is transferred to the rearward-oriented state relative to the fixed mast 21. In this case, as shown in FIG. 12, the load receiving member 26 is rearwardly moved in the direction as indicated by an arrow X, and disengaged from the lock pawl 34 because the rearward motion of the lock pawl 34 is restricted by the stopper pin 38. Therefore, the movable mast 22 is transferred and kept to its rearward-oriented state (the rearward-oriented state of the movable mast 22 in the automatic mode). At this time, the mount pin L1 is located at the rear end of the elongated hole 21a, and the angle of penetration δ is larger than that in the frontward-oriented state of the movable mast 22 as shown in FIG. 6, so that the bottom can reach the predetermined depth of soil at a shorter moving distance of the tractor T.

When the bottom reaches the predetermined plowing depth in the soil and then is slightly lifted up using a lifting function of the tractor T, the load receiving member 26 is frontwardly moved and thus the lock pawl 34 is frontwardly pushed from the rear side thereby by the load receiving member 26 as shown in FIG. 12, so that the peripheral surface of the load receiving member 26 is engaged with the curved surface 32a of the lock member 32. That is, through this operation, the movable mast 22 is automatically transferred and kept to the lock state (the frontward-oriented and locked state of the movable mast 22 in the automatic mode). Therefore, the ordinary plowing work can be continued while the movable mast 22 is kept in the frontward-oriented state. After the plowing operation for one line by the tractor T is completed, upon lifting up the bottom plow, the top link L pushes the arm 42 downwardly to release the restriction of the load receiving member 26 by the lock member 32 (a lock-releasing state in the automatic mode).

The first embodiment is described particularly in a case where this invention is applied to the bottom plowing machine. However, this invention may be applicable to various agricultural machines such as a sub soiler, a digging machine and so on, which carries out an agricultural work in a deep portion of soil.

Figure 17:
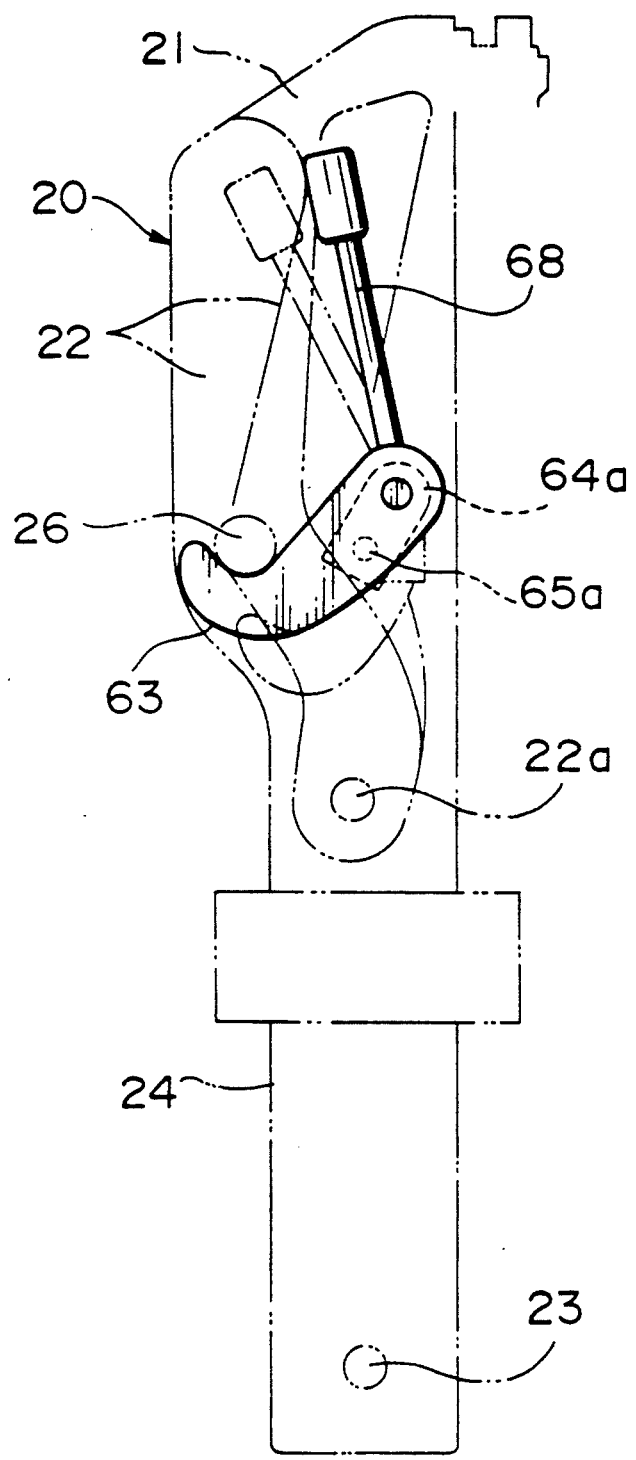
FIG. 17 is a side view of a modification of the mode selecting mechanism.
Figure 18:
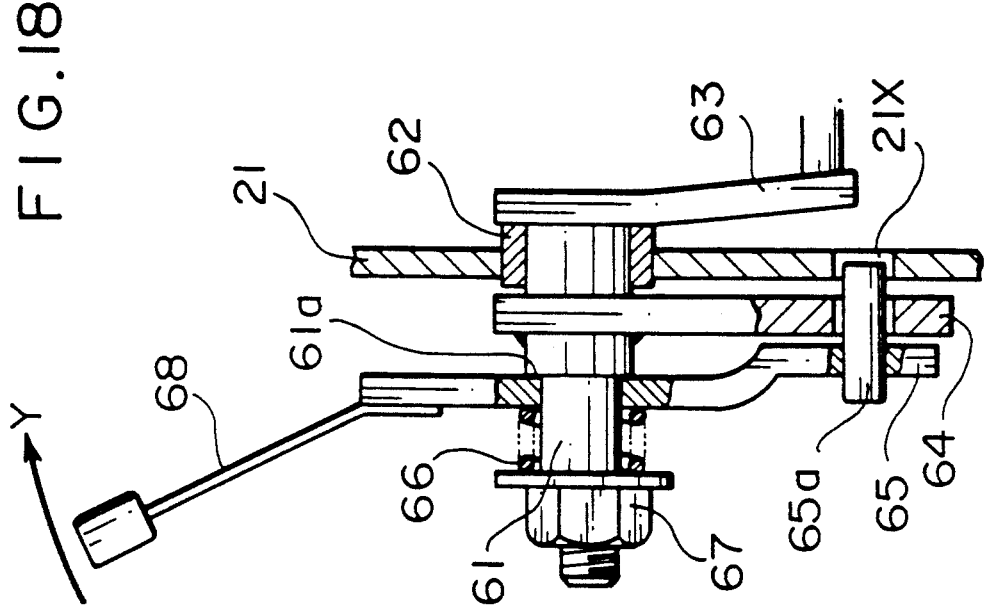
FIG. 18 is a side view of another modification of the mode selecting mechanism.

Further, various modifications as shown in FIGS. 17 and 18 may be made to the mode selecting mechanisms of the first embodiment and a second embodiment as described later. For example, as shown in FIGS. 17 and 18, a pivot shaft 61 is penetrated through the fixed mast 21, and a hook 63 is fixedly secured to the pivot shaft 61 through a collar in the inner space of the fixed mast 21 such that the hook 63 is rotatable integrally with the pivot shaft 61. In addition, a swingable plate having one end portion which is secured to the pivot shaft 61 outside of the fixed mast 21 and other end portion (lower end portion) having a through hole 64a is provided at the outside of the fixed mast 21 as shown in FIG. 18, and an operating lever 65 which is freely rotatably mounted on the pivot shaft 61 and whose one end portion has a stopper 65a insertable through the through hole 64a of the swingable 64 is provided outside of the swingable plate 64. The operating lever 65 is urged against the swingable plate inwardly by a urging spring 66 while its inward motion is restricted by a step portion 61a. A bolt 67 serving as a spring bearing for receiving the urging spring 66 is spirally engaged with a free end of the pivot shaft 61. Further, a handle 68 extending upwardly is secured to the upper portion of the operating lever 65 as shown in FIGS. 17 and 18.

This modification is so designed that a user on the tractor T can manipulate the handle T to push or draw the handle T in a Y-direction (FIG. 18) toward the fixed mast side against the urging force of the urging spring 66 so that the stopper 65a is disengaged from a through hole 21X of the fixed mast 21, and then the user can rotate the handle 68 by a suitable angle on a plane parallel to the side wall of the fixed mast 21. When the operating lever 65 is rotated interlockingly with the rotation of the handle 68, the tip portion of the hook 63 which is secured to the pivot shaft 61 abuts against the load receiving member 26 to keep the movable mast 22 to its rearward-oriented state. Therefore, the movable mast 22 is kept to the rearward-oriented state, and thus the angle of penetration of the bottom can be intentionally increased (the rearward-oriented and locked state of the movable mast). The release of the rearward-oriented and locked state of the movable mast 22 can be carried out in the reverse operation of the handle 68 to the operation as described above.

Figure 19:
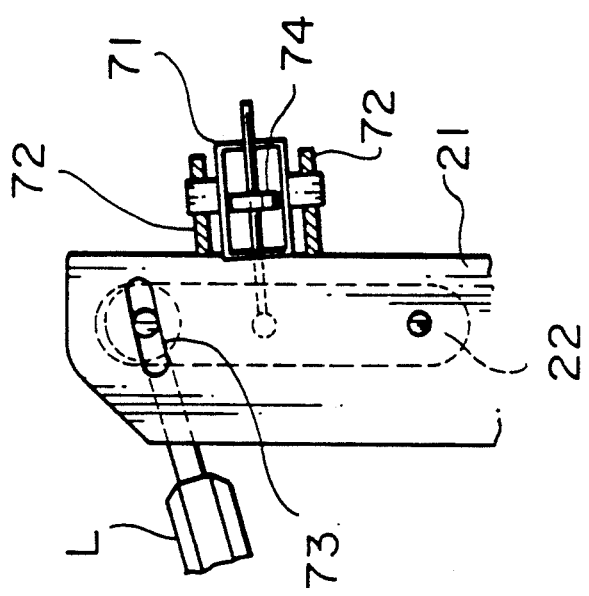
FIG. 19 is side view of another modification of the mode selecting mechanism using a hydraulic cylinder.
Figure 20:
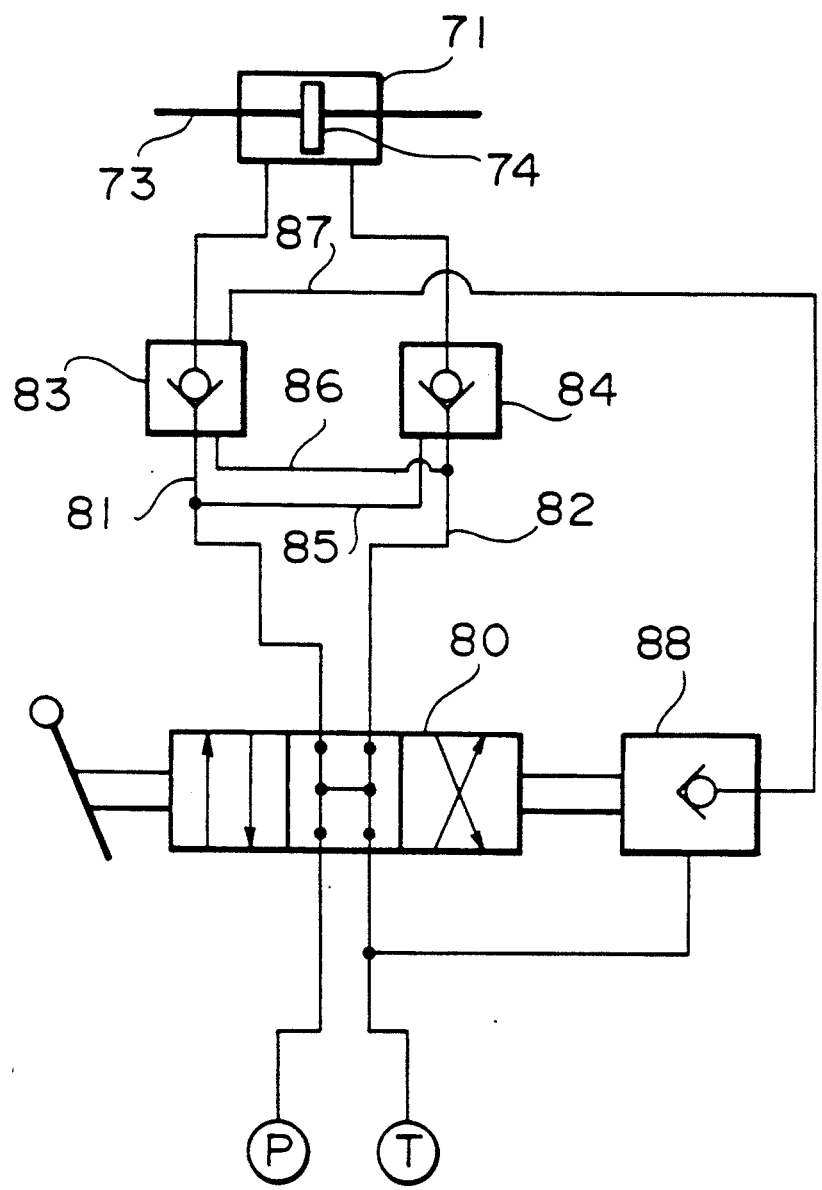
FIG. 20 shows a hydraulic-pressure driving circuit for the mode selecting mechanism as shown in FIG. 19.

Otherwise, the mode selecting operation may be carried out through a switching operation of a hydraulic circuit by the user on the tractor T. For example, as shown in FIGS. 19 and 20, an oil cylinder 71 is secured through a support plate 72 to the fixed mast 21 while the end portion of a piston rod 73 of the oil cylinder 71 is fixed to the movable mast 21. The mode selection can be carried out by controlling the motion of a piston 74. That is, as shown in FIG. 20, the oil cylinder 71 is connected through a switch valve 80 to a hydraulic pump P and a return pump T (not shown). The switching operation of the switch valve 80 is carried out by a manual operation of the user. The switch valve 80 is a three-position and two-port type, and includes a circuit for allowing the movable mast 22 to be kept in the frontward-oriented state, an oil passageway 81 for the frontward state, a oil passageway 82 for the rearward-oriented state, check values 83 and 84 each provided to the oil passageways 81 and 82 respectively for preventing oil flow to the return tank and preventing oil leakage, and bypass passageways 85 and 86 through which the oil check valves 83 and 84 are intercommunicated and which serve to return leaked oil. The check valves 83 and 84 are intercommunicated to each other through another bypass passageway 87, and through the bypass passageway 87, the leaked oil is returned from the switch valve 80 through a check valve 88 to the return tank.

Next, a second embodiment in which this invention is applied to a reversible plowing machine will be described with reference to FIGS. 21 to 29. The basic construction of this embodiment is substantially identical to that of the first embodiment, except for additional provision of a reversing mechanism for the bottom and the construction of the mode selecting mechanism. Therefore, the detailed description of the same construction and elements is eliminated hereunder, and only the different points between the first and second embodiments will be described in detail. In the following description, the same elements as described in the first embodiment are represented by the same reference numerals.

Figure 21:
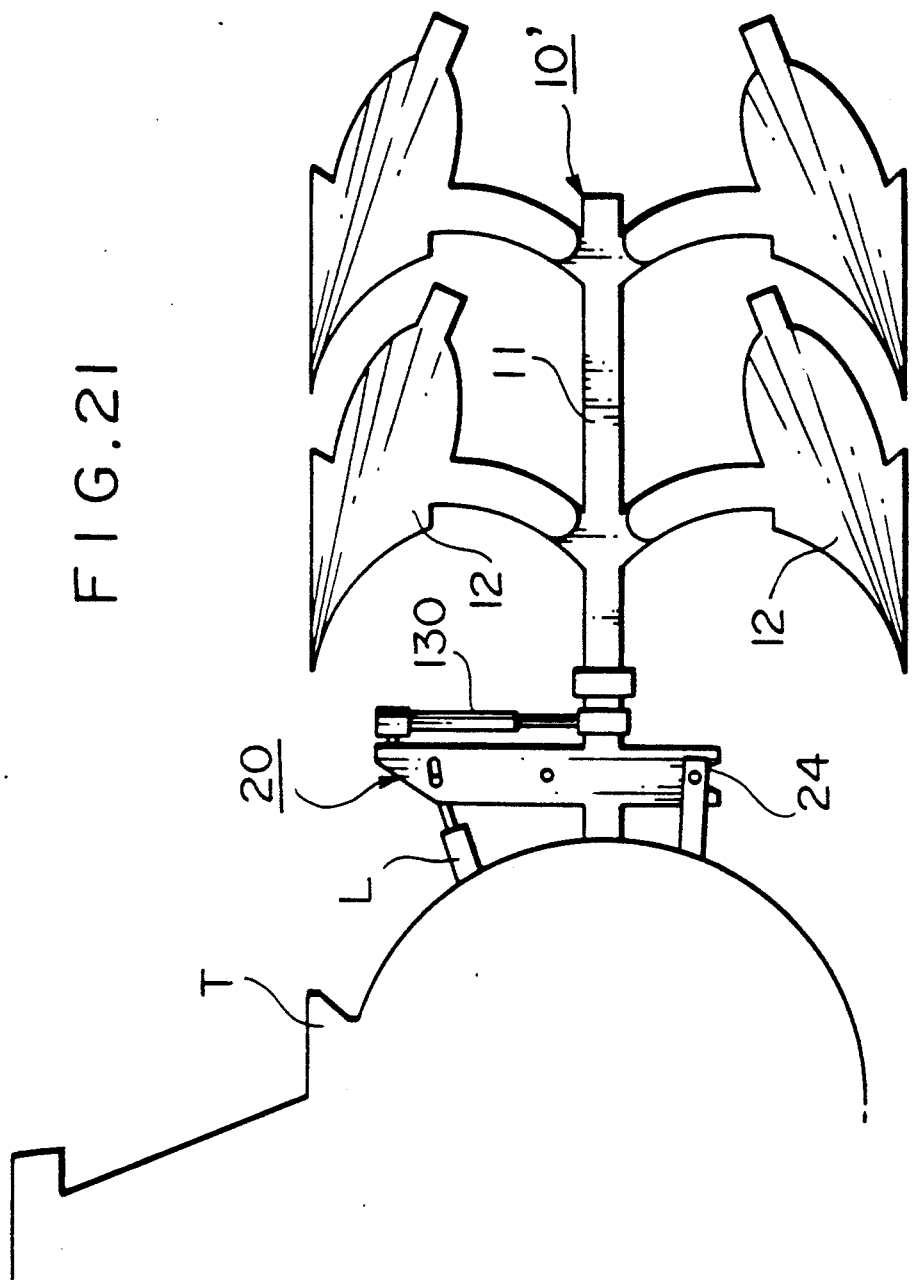
FIG. 21 schematically shows the whole construction of a reversible plowing machine to which this invention is applied.
Figure 22:
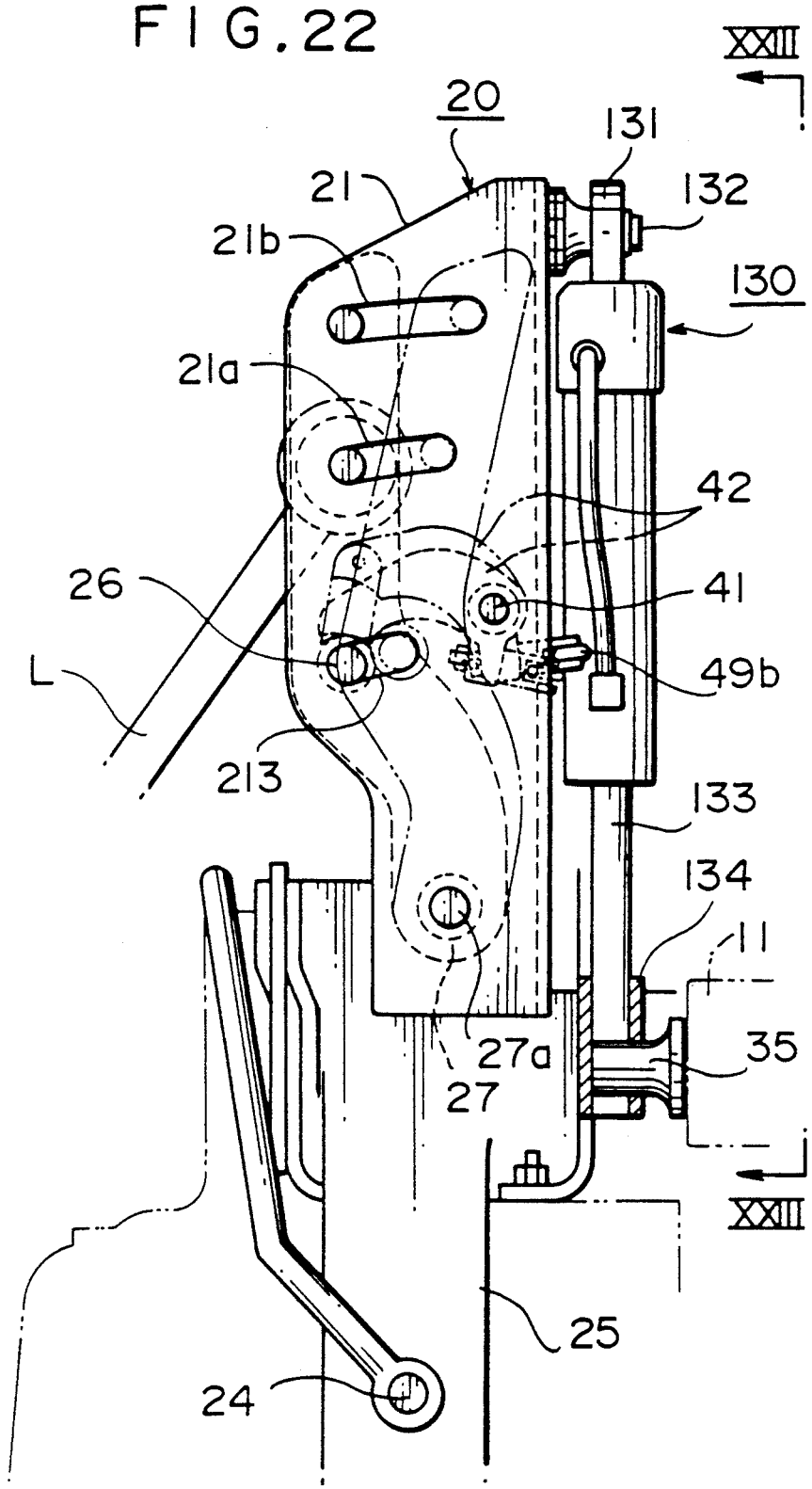
FIG. 22 is a detailed side view of a mast mechanism of the reversible plowing machine as shown in FIG. 21.
Figure 23:
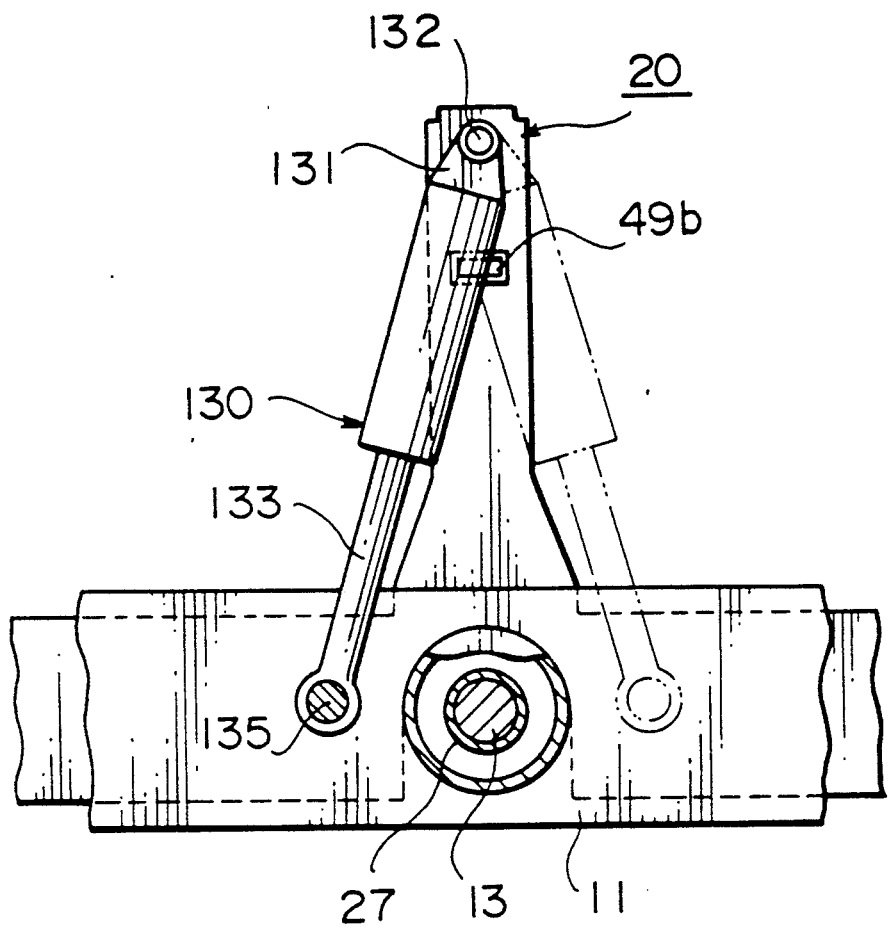
FIG. 23 is a schematic view of a reversing cylinder which is taken along a line III—III of FIG. 22.

In this embodiment, the plow frame 11 is freely rotatably mounted to the mast mechanism 20 serving as a non-rotatable member through a rotating main shaft 13 as shown in FIG. 23 to reverse (or rotate) the bottom 12 around the plow frame 11, and two arrays of bottoms 12 are secured to the plow frame 11 such that they are located at the opposite sides with respect to the plow frame 11 as shown in FIG. 21.

Figure 25:
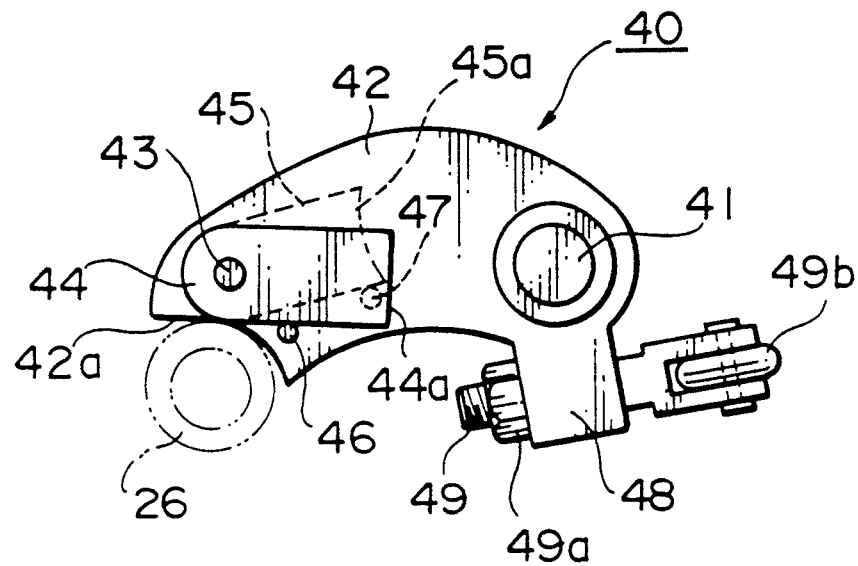
FIG. 25 is a side view of a mode selecting mechanism of the reversible plowing machine.

FIG. 25 shows a mode selecting mechanism 40 of this embodiment. Like the first embodiment, the mode selecting mechanism 40 of this embodiment is disposed between the movable mast 22 and the fixed mast 21. The mode selecting mechanism 40 has a lock member 42 which is pivotably mounted on a pivot shaft 41 having both ends secured to the fixed mast 21. The lock member 42 comprises a substantially hanger-shaped plate member, and has a downwardly-curved surface 42a at the free end thereof. The profile of the curved surface 42a of the lock member 42 is designed so as to correspond to the peripheral surface of the load receiving member 26, similarly in the first embodiment.

The lock member 42 is provided with a pin 43 at the free end thereof such that both ends of the pin 43 are projected from the side walls of the free end portion, and a lock pawl 44 and an unlock pawl 45 are freely rotatably secured to the ends of the pin 43, respectively. The lock pawl 45 has a flat surface at the free end portion thereof while the free end of the unlock pawl 45 is provided with a curved surface 45a whose profile corresponds to that of the peripheral surface of the load receiving member 26. The end surface 45a of the unlock pawl 45 is engaged with the peripheral surface of the load receiving member 26, and in this state the unlock pawl 45 is movable in cooperation with the load receiving member 26.

The lock member 42 is further provided with stopper pins 46 and 47 at the both side walls of the free end portion thereof. The stopper pin 46 serves to keep the lock pawl 44 to its storage state (a state where the lock pawl 44 is mounted on the stopper pin 46), and also serves to prevent the lock pawl 44 from being further counterclockwisely (rearwardly) rotated to the rear side of the stopper pin 46 after the lock pawl 44 is counterclockwisely (frontwardly) rotated in its storage state. On the other hand, the stopper 47 serves to keep the unlock pawl 47 to its storage state (a state where the unlock pawl 45 is mounted on the stopper pin 47).

The lock member 42 is further provided with an arm 48 at the other end thereof (the end portion at the pivot shaft 41 side) such that the arm 48 is downwardly projected from the other end of the lock member 42. The arm 48 has a screw portion into which an adjusting screw 49 is spirally inserted through a nut 49a. The adjusting screw 49 is frontwardly and rearwardly movable by any distance through the screw portion by rotating the nut 49a. The adjusting screw 49 is provided with a roller 49a at the tip portion thereof. The roller 49a is projected from the partly-opened rear wall of the fixed mast 21 and located in a swing route (region) of a reversing cylinder 130 such as a hydraulic cylinder as described below, and is pushed frontwardly by the reversing cylinder 130 every swing motion of the reversing cylinder 130.

Like the first embodiment, the storage state and the operating state of the lock pawl 44 and the unlock pawl 45 are manually selected by the user on the tractor T.

Figure 24:
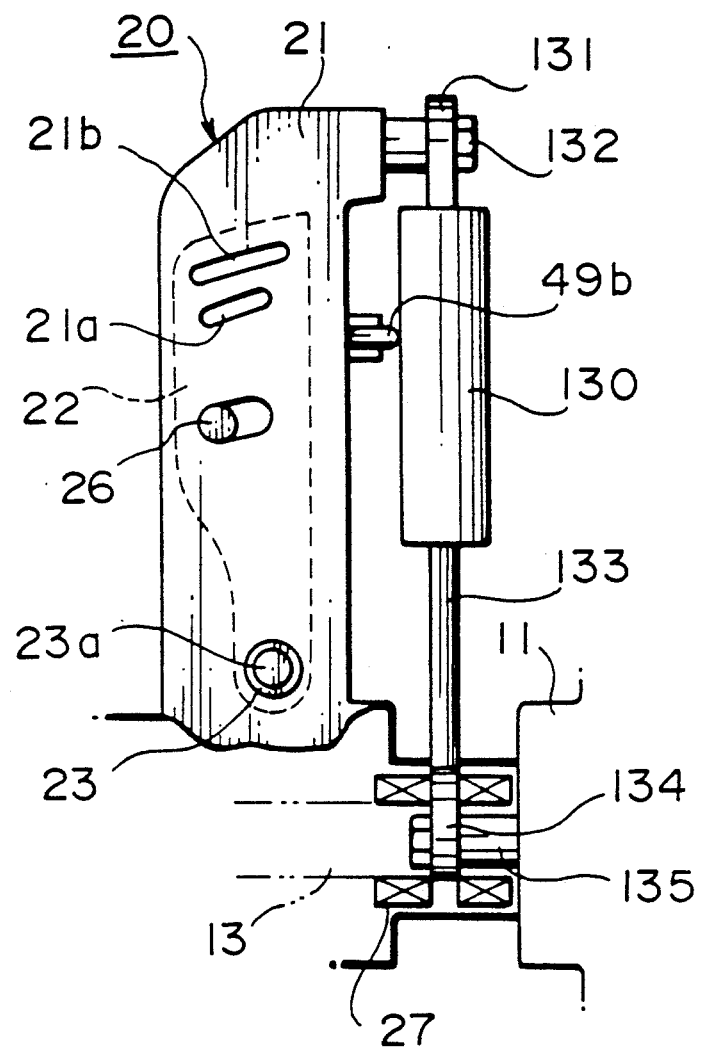
FIG. 24 is a side view of FIG. 23.

The reversing cylinder 130 for reversing the bottom 12 is disposed between the plow frame 11 and the mast mechanism 20 serving as a non-rotatable member as shown in FIG. 24, and is extended and contracted by hydraulic pressure. As shown in FIG. 24, the upper end portion of the reversing cylinder 130 is pivotably supported to the top portion of the fixed mast 21 through a mount pin 132. On the other hand, as shown in FIG. 23, the lower end portion of a cylinder rod 133 of the reversing cylinder 130 is secured to the front surface of the plow frame 11 through a pin 35 which is projectingly provided on the front surface of the plow frame 11 spacedly from the rotating main shaft 13.

The rotating main shaft 13 is freely rotatably engaged with a bearing which is secured to the lower portion of the mast mechanism 20 so that the plow frame 11 is rotated by substantially 180 degrees (i.e. reversed) through the extending and contracting operation of the reversing cylinder 130. That is, the plow frame 11 is rotated by 90 degrees when the reversing cylinder 130 is transferred from the extended state to the contracted state, and further rotated by 90 degrees when it is further transferred from the contracted state to the extended state. Accordingly, the reversing operation of the plow frame 11 is carried out through one-cycle motion of the reversing cylinder 30.

When the plowing operation is carried out using the reversible plowing machine, the top link L of the tractor T is secured to any selected one of the elongated holes 21a and 21b through the mount pin L1. In the ordinary state, the mount pin L1 is located at the position f (the position nearest to the tractor T) in the elongated hole 21a as shown in FIG. 6. As described above, if the plowing operation is started in this ordinary state, the bottom 12 starts its digging into the soil at the predetermined suction angle interlockingly with the running of the tractor T, but the tractor T must run at a long distance until the bottom 12 reaches the predetermined plowing depth of soil. Therefore, as described in the first embodiment, when the plowing work is started, the angle of penetration of the bottom 12 is changed from the angle $\alpha$ to the angle $\theta$ which is slightly larger than the angle $\alpha$ as shown in FIG. 7.

Next, the mode selecting operation for the reversible plowing machine will be described. In the following description, the lock mode, the free mode and the automatic mode have the same definitions as described in the first embodiment, and thus the detailed description thereof is eliminated.

The lock mode for the reversible plowing machine will be first described below.

The lock mode is defined as a mode for keeping a state where the movable mast 22 is fixed to the fixed mast 21 in its frontward-oriented state. In the lock mode, as shown in FIG. 2, the pivot shaft L1 is located at the front side of the elongated hole 21a (the one end of the elongated hole 21a which is nearest to the tractor T), and the movable mast 22 is kept in the frontward-oriented state with respect to the fixed mast 21 even when the plowing machine is lifted up by the tractor T (the mount pin 31 is located at the position f in the elongated hole 21a as shown in FIG. 6).

Figure 26:
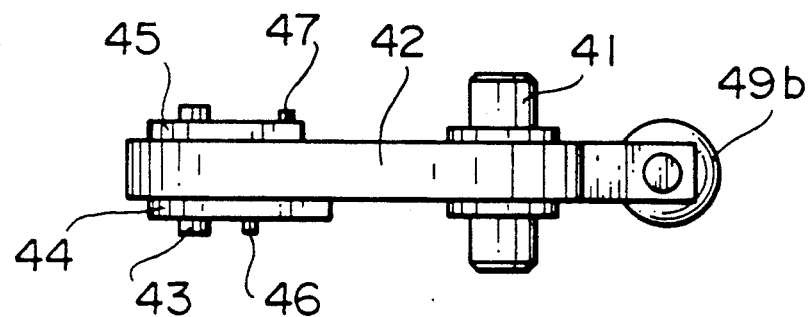
FIG. 26 is a plan view of the mode selecting mechanism as shown in FIG. 25.

This lock mode is selected by keeping both of the lock pawl 44 and the unlock pawl 45 of the lock member 42 to their storage states, that is, by rotating both of the lock pawl 44 and the unlock pawl 45 around the pivot pin 46 to mount them on the stopper pins 46 and 47 respectively as shown in FIGS. 25 and 26.

In these storage states of the lock pawl 44 and the unlock pawl 45, the curved surface 42a of the lock member 42 is directly engaged with the peripheral surface of the load receiving member 26 which is provided integrally to the movable mast 22, so that the rearward motion of the movable mast 22 is inhibited by the lock member 42, that is, the movable mast 22 is fixed to the frontward-oriented state. This state is identical to a state which can be uniquely adopted by a conventional plowing machine.

When the reversible plowing machine 10' is lifted up and then reversed in the lock mode as described above, the reversing cylinder 30 is swung in a plane parallel to the rear wall of the fixed mast 21, so that the roller 49a projecting into the swing region of the reversing cylinder 30 is frontwardly pushed by the reversing cylinder, so that the lock member 42 is clockwisely rotated around the pivot shaft 41. Therefore, the lock member 42 is temporarily separated from the load receiving member 26, but is engaged with the load receiving member 26 again after the reversing cylinder 30 is passed over the roller 49a. Accordingly, in this lock mode, the movable mast 22 is kept to its frontward-oriented state irrespective of a reversing operation of the bottom.

The free mode for the reversible plowing machine 10' will be next described hereunder.

Figure 27:
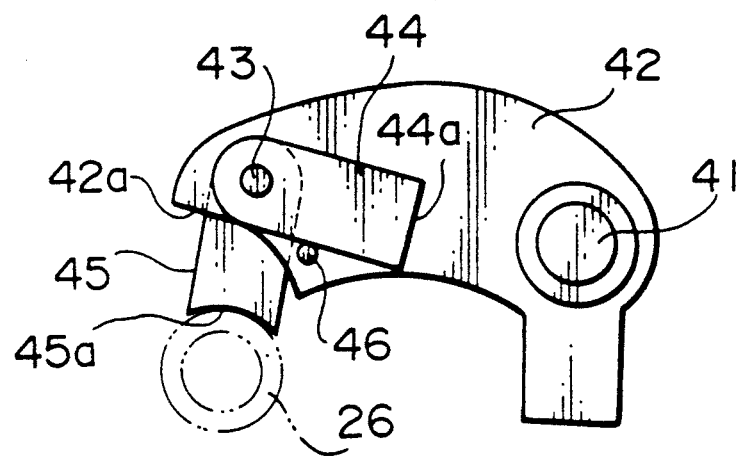
FIG. 27 is a side view of the mode selecting mechanism when a free mode is selected.

The free mode is selected as follows. As shown in FIG. 27, the lock pawl 44 is kept to its storage state (i.e., mounted on the pin 46) while the unlock pawl 45 is rotated to the tractor side and hung down due to its weight. When the plowing machine 10' is reversed in this state, the lock member 42 is temporarily rotated and thus the unlock pawl 45 is mounted on the load receiving member 26. The engagement between the curved surface 45a of the unlock pawl 45 and the peripheral surface of the load receiving member 26 is kept. Even when the reversible plowing machine 10' is further reversed and thus the curved surface 45a of the unlock pawl 45 is temporarily separated from the load receiving member 26, the unlock pawl 45 is engaged with the load receiving member 26 again when the lock member 42 is moved (returned) again because the unlock pawl 45 is hung down due to its weight. Therefore, the lock member 42 is movable interlockingly with the movement of the movable mast 22 while the lock member 42 and the load receiving member 26 are kept spacedly from each other at a constant distance. Accordingly, in this free mode, the movable mast 22 is kept to its free state irrespective of the reversing operation of the bottom.

Next, the automatic mode will be described hereunder.

Figure 28:
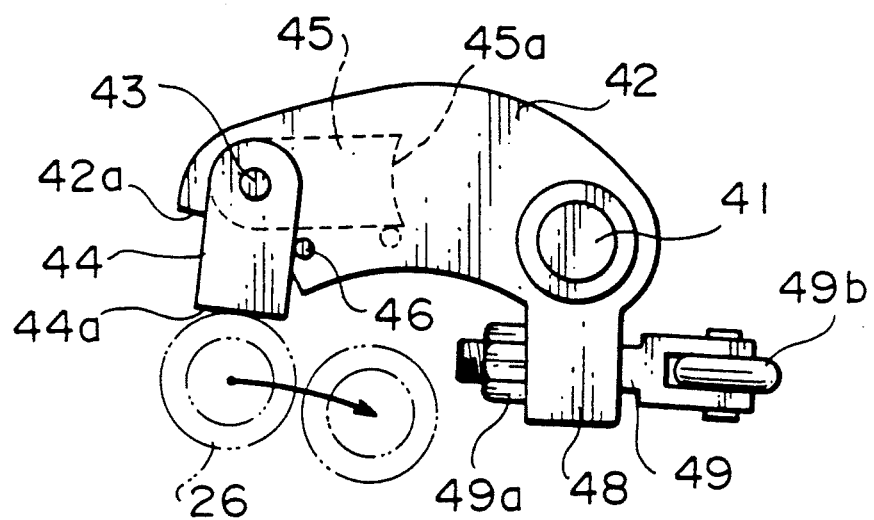
FIG. 28 is a side view of the mode selecting mechanism when an automatic mode is selected.

The automatic mode is selected as follows. As shown in FIG. 28, the unlock pawl 45 is kept to its storage state (i.e., mounted on the pin 47) while the lock pawl 44 is frontwardly rotated to be allowed to be hung down due its weight. In this state, the lock pawl 44 is not mounted on the load receiving member 26, and freely rotatable toward the tractor side while its rearward rotation is restricted by the stopper pin 46.

Figure 9:
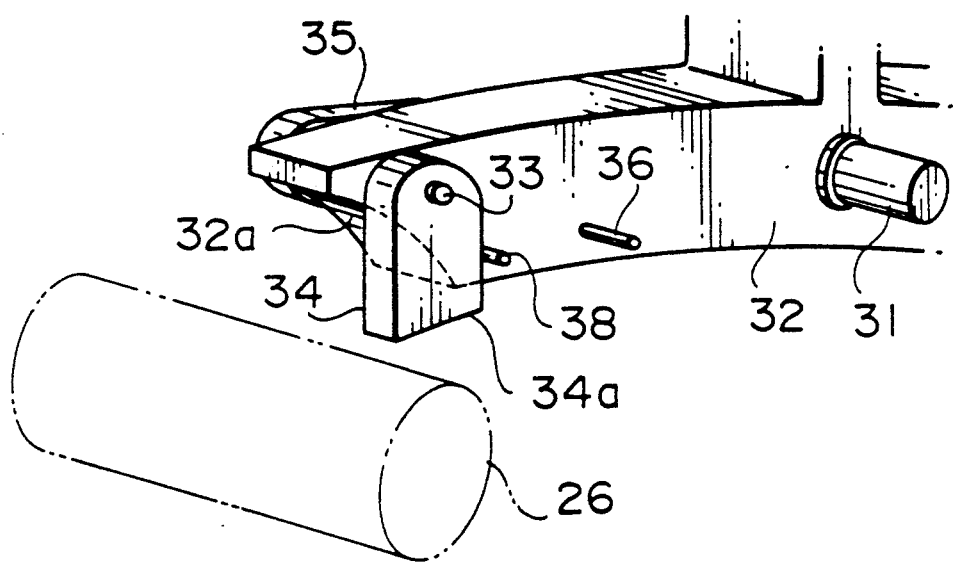
FIG. 9 is a perspective view of the mode selecting mechanism when an automatic mode is selected.
Figure 10:
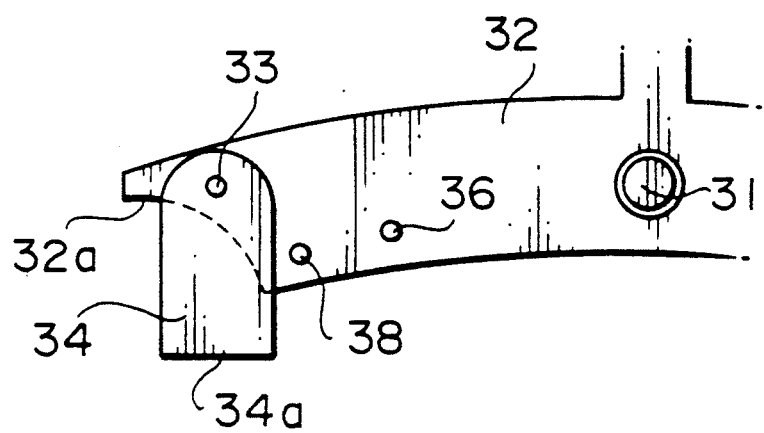
FIG. 10 is a side view of the mode selecting mechanism when the automatic mode is selected.
Figure 11:
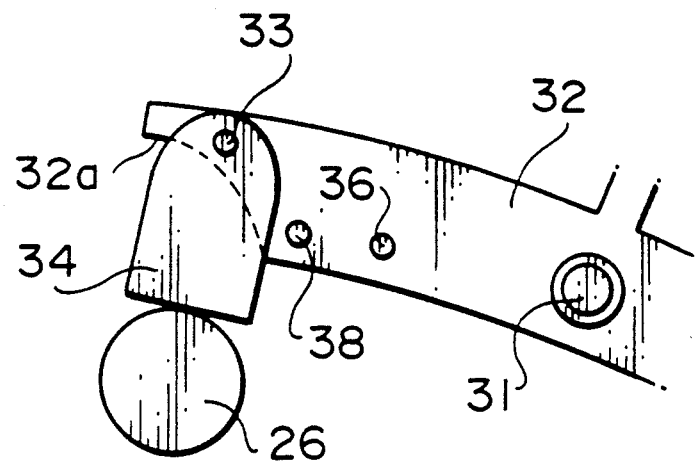
FIG. 11 is a side view of the mode selecting mechanism when a rearward-oriented and locked state is selected.
Figure 29:
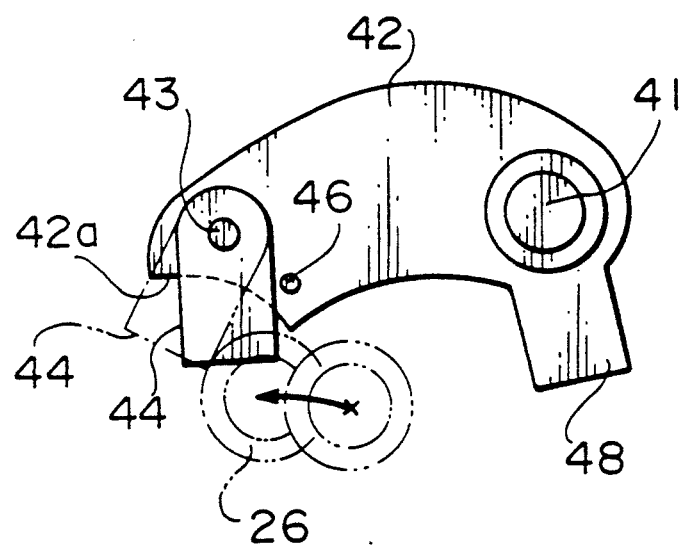
FIG. 29 is a side view of the mode selecting mechanism when a plowing work is stated in the automatic mode.

When the reversible plowing machine 10' is lifted up in the above state as shown in FIG. 9, the top link L draws the movable mast 22 frontwardly, whereby the load receiving member 26 is disengaged from the lock pawl 44 and kept to its rearward-oriented state (the rearward-oriented and locked state of the movable mast 22). Even when the load receiving member 26 is disengaged from the lock pawl 44, the load receiving member 26 is frontwardly moved in a next returning operation of the load receiving member 26 as described below while pushing the lock pawl 44 frontwardly as shown in FIG. 29, and the lock pawl 44 is mounted on the load receiving member 26 when the load receiving member 26 is moved below the lock pawl 44. Therefore, the lock member 42 is prevented from being directly engaged with the load receiving member 26.

That is, in this state, when the reversible plowing machine 10' is lifted up and then reversed, the roller 49a is frontwardly pushed by the swing motion of the reversing cylinder 30 as shown in FIG. 23, and the lock member 42 is clockwisely rotated around the pivot shaft 41. Through this rotation of the lock member 42, the lock pawl 44 is temporarily mounted on the load receiving member 26, and the movable mast 22 is kept to a state where it is freely movable (lock-release state in the automatic mode).

When the lock member 42 is separated from the load receiving member 26, the lock pawl 44 is downwardly rotated and kept to a state where it is allowed to be mounted on the load receiving member 26, so that the movable mast 22 is transferred to the lock-release state as shown in FIG. 29 (a lock-release state in the automatic mode where the movable mast 22 is transferred to the rearward-oriented state when the bottom 12 is downwardly descended to start the digging of the bottom 12 into the soil, and is automatically transferred to the frontward-oriented state after the digging of the bottom 12 is completed).

In this state, when the reversible plowing machine 10' is descended and the tractor T is moved to start the plowing work, a resistance force is applied to the bottom 12, and the movable mast 22 is about to be transferred to the rearward-oriented state relative to the fixed mast 21, so that the load receiving member 26 is disengaged from the lock pawl 44 and moved rearwardly as shown in FIG. 28. Therefore, the movable mast 22 is finally kept to its rearward-oriented state (the rearward-oriented state of the movable mast 22 in the automatic mode). At this time, the mount pin L1 is located at the rear end position r of the elongated hole 21a, and the angle of penetration δ is larger than that in the frontward-oriented state of the movable mast 22 as shown in FIG. 7, so that the bottom can reach the predetermined depth of soil at a shorter moving distance of the tractor.

When the bottom 12 reaches the predetermined plowing depth in the soil and then the lower link of the tractor is slightly lifted up through a lifting operation, the movable mast 22 is moved to be frontwardly oriented, and thus the load receiving member 26 is frontwardly moved to frontwardly push the lock pawl 44 from the rear side of the lock pawl 34 as shown in FIG. 29, so that the peripheral surface of the load receiving member 26 is engaged with the curved surface 42a of the lock member 42. That is, through this operation, the movable mast 22 is kept to the lock state (the frontward-oriented and locked state of the movable mast 22 in the automatic mode). Therefore, the ordinary plowing work can be continued while the movable mast 22 is kept in the frontward-oriented state. After the plowing operation for one line by the tractor T is completed, upon lifting up and reversing the reversible plowing machine 10', the lock state is released (the lock-release state in the automatic mode).

The modifications as shown in FIGS. 17 to 20 which may be made to the first embodiment, may be also made to the second embodiment, and the description thereof is eliminated.

As described above, according to the agricultural machine of this invention, since the mast mechanism is constituted by the movable mast and the fixed mast and the movable mast is intentionally movable in the inner space of the fixed mast, the angle of penetration of the plow or the like can be set to a larger value by transferring the frontward-oriented state of the rearward-oriented state. In other words, the angle at a working part such as a bottom or the like penetrates into the soil can be freely changed (increased) at the start time of the plowing operation, and thus the working part can reach the predetermined plowing depth of the soil at a short moving distance of the tractor. Therefore, the area of a headland can be reduced even in a relatively narrow field. In addition, since the movable mast is kept in the rearward-oriented state when the agricultural machine is lifted up, the lift height of the machine can be increased, so that the agricultural machine itself never obstruct the running of the tractor, and thus the tractor can smoothly move from a filed to another field over a ridge.

What is claimed is:

1. An agricultural machine having a frame and a mast through which a top link of a tractor is mounted to the frame to perform a plowing operation of soil through a running of the tractor, including:
   a fixed mast secured to said frame so as to be projected from a front end portion of said frame;
   a movable mast which is pivotably mounted to said fixed mast so as to be arcuately movable in an agricultural working direction relatively to said fixed mast and has a mount portion to which the top link is mounted; and
   means for changing a penetrating angle of said agricultural machine into the soil, said means for changing the penetrating angle comprising a mode selecting mechanism provided between said movable mast and said fixed mast for changing and fixing a positional relationship between said movable mast and said fixed mast interlockingly with a lifting operation of said agricultural machine, thereby to freely change the penetrating angle of said agricultural machine into the soil.

2. The agricultural machine as claimed in claim 1, wherein said fixed mast comprises a plate member having a U-shaped section, and said movable mast comprises a pair of plate members which are parallel linked to each other in an inner space of said fixed mast and has a pivot shaft which is rotatably mounted to said fixed mast, said movable mast being swingable around said pivot shaft in the inner space of said fixed mast.

3. The agricultural machine as claimed in claim 2, wherein said fixed mast has at least one elongated hole at the side walls thereof and said movable mast has a mount pin through which the top link is secured to said movable mast, both ends of said mount pin being engaged with said elongated hole so that said movable mast is slidably guided along said elongated hole.

4. The agricultural machine as claimed in claim 1, wherein said mode selecting mechanism includes a load receiving member fixed to said movable mast and a plate member which is rotatably secured to said fixed mast and has at one end portion thereof a curved surface engageable with said load receiving member, an arcuate motion of said movable mast being restricted or locked through the engagement between the curved surface of said plate member and said load receiving member.

5. The agricultural machine as claimed in claim 4, wherein said mode selecting mechanism further includes a hanger-shaped plate member which is rotatably mounted to said movable mast, said hanger-shaped plate member having at one end thereof an arm which extends vertically to a plane containing the top link and is allowed to abut against the top link through the lifting operation of the top link and at the other end thereof a pushing member which abuts against one point of said plate member to rearwardly push said plate member such that said plate member is rotatable interlockingly with the lifting operation of the top link, thereby releasing a locked state of said movable mast by said plate member.

6. The agricultural machine as claimed in claim 5, wherein said pushing member comprises an adjusting screw.

7. The agricultural machine as claimed in claim 5, wherein said pushing member comprises a plunger which is operated interlockingly with the upward motion of the top link L to rearwardly push said plate member.

8. The agricultural machine as claimed in claim 4, wherein said plate member includes a lock pawl having a flat surface and an unlock pawl having a curved surface engageable with said load receiving member, which are rotatably provided at both side walls of said plate member respectively, and wherein when said unlock pawl and said load receiving member are engaged with each other, said movable mast is freely movable, and when said lock pawl and said load receiving member are engaged with each other, said movable mast is automatically transferred to a frontward-oriented state during an agricultural work.

9. The agricultural machine as claimed in claim 4, wherein said plate member has an elongated portion having a through hole at the rear end portion thereof, and said mode selecting mechanism further includes a chain having one end linked to the rear end portion of said plate member through said through hole of said plate member and the other end linked to a draw bar of the tractor, when said agricultural machine is lifted up, said chain C being supplied with a drawing force and said plate member being rotated by the drawing force of said chain C to release the engagement between the curved surface of said plate member and said load receiving member.

10. The agricultural machine as claimed in claim 1, wherein said mode selecting mechanism comprises a lever mechanism whose rotating position is freely changeable by an user, said movable mast being linked to said lever mechanism so that a swing position of said movable mast 22 is freely determined by rotating said lever mechanism.

11. The agricultural machine as claimed in claim 10, wherein said lever mechanism comprises a pivot shaft penetrated through said fixed mast, a hook secured to said pivot shaft in the inner space of said fixed mast so as to be rotatable integrally with said pivot shaft, a swingable plate having one end portion which is secured to said pivot shaft and the other end portion having a through hole, and an operating lever which is rotatably mounted on said pivot shaft and whose one end portion has a stopper insertable through said through hole of said swingable plate, said hook being allowed to abut against said movable mast so that the rotational position of said movable mast is controlled by said hook through the rotation of said operating lever.

12. The agricultural machine as claimed in claim 1, wherein said mode selecting mechanism comprises a hydraulic mechanism having one end secured to said fixed mast and the other end secured to said movable mast 21, the positional relation between said movable mast and said fixed mast being controlled through an extending and contracting operation of said hydraulic mechanism.

13. The agricultural machine as claimed in claim 1, further including a reversible plowing machine having two arrays of bottoms disposed at the opposite sides of said frame.

14. The agricultural machine as claimed in claim 13, further including a reversing mechanism comprising a hydraulic cylinder which is reciprocatively swingable in accordance with an extending and contracting motion thereof and reverses said plowing machine through the reciprocative swing motion.

15. The agricultural machine as claimed in claim 14, wherein said mode selecting mechanism includes a load receiving member fixed to said movable mast and a plate member which is rotatably secured to said fixed mast and has at one end portion thereof a curved surface engageable with said load receiving member, an arcuate motion of said movable mast being restricted or locked through the engagement between the curved surface of said plate member and said load receiving member.

16. The agricultural machine as claimed in claim 15, wherein said plate member includes a roller which is disposed in a region of the swing motion of said hydraulic cylinder and is frontwardly pushed by said hydraulic cylinder interlockingly with the swing motion of said hydraulic cylinder, said plate member being rotated in accordance with the pushing operation of said roller by said hydraulic cylinder to perform a mode selecting operation.

17. An agricultural machine having a frame and a mast through which a top link of a tractor is mounted to the frame to perform a plowing operation through a running of the tractor, including:
- a fixed mast secured to said frame so as to be projected from a front end portion of said frame;
- a movable mast which is pivotably mounted to said fixed mast so as to be arcuately movable in an agricultural working direction relatively to said fixed mast and has a mount portion to which the top link is mounted; and
- a mode selecting mechanism provided between said movable mast and said fixed mast for changing and fixing a positional relationship between said movable mast and said fixed mast interlockingly with a lifting operation of said agricultural machine to thereby freely change a penetrating angle of said agricultural machine into soil, wherein said fixed mast comprises a plate member having a U-shaped section, and said movable mast comprises a pair of plate members which are parallel linked to each other in an inner space of said fixed mast and has a pivot shaft which is rotatably mounted to said fixed mast, said movable mast being swingable around said pivot shaft in the inner space of said fixed mast.

18. An agricultural machine having a frame and a mast through which a top link of a tractor is mounted to the frame to perform a plowing operation through a running of the tractor, including:
- a fixed mast secured to said frame so as to be projected from a front end portion of said frame;
- a movable mast which is pivotably mounted to said fixed mast so as to be arcuately movable in an agricultural working direction relatively to said fixed mast and has a mount portion to which the top link is mounted; and
- a mode selecting mechanism provided between said movable mast and said fixed mast for changing and fixing a positional relationship between said movable mast and said fixed mast interlockingly with a lifting operation of said agricultural machine to thereby freely change a penetrating angle of said agricultural machine into soil, wherein said mode selecting mechanism includes a load receiving member fixed to said movable mast and a plate member which is rotatably secured to said fixed mast and has at one end portion thereof a curved surface engageable with said load receiving member, an arcuate motion of said movable mast being restricted or locked through the engagement between the curved surface of said plate member and said load receiving member.

* * * * *